(12) United States Patent
Yang

(10) Patent No.: US 12,121,809 B2
(45) Date of Patent: Oct. 22, 2024

(54) OPERATION CONTROL METHOD AND APPARATUS, ELECTRONIC DEVICE, AND STORAGE MEDIUM

(71) Applicant: Tencent Technology (Shenzhen) Company Limited, Shenzhen (CN)

(72) Inventor: Jin Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 635 days.

(21) Appl. No.: 17/317,853

(22) Filed: May 11, 2021

(65) Prior Publication Data
US 2021/0260479 A1    Aug. 26, 2021

Related U.S. Application Data

(63) Continuation of application No. PCT/CN2020/079706, filed on Mar. 17, 2020.

(30) Foreign Application Priority Data

Apr. 11, 2019 (CN) .......................... 201910290727.0

(51) Int. Cl.
*A63F 13/525* (2014.01)
*A63F 13/40* (2014.01)
(Continued)

(52) U.S. Cl.
CPC ............ *A63F 13/525* (2014.09); *A63F 13/40* (2014.09); *A63F 13/837* (2014.09);
(Continued)

(58) Field of Classification Search
CPC ...... A63F 13/525; A63F 13/40; A63F 13/837; A63F 2300/1068; A63F 2300/8076;
(Continued)

(56) References Cited

U.S. PATENT DOCUMENTS 8,939,836 B2    1/2015  Wang
8,951,128 B1    2/2015  Farley et al.
(Continued)

FOREIGN PATENT DOCUMENTS

CN    105688409 A    6/2016
CN    106293070 A    1/2017
(Continued)

OTHER PUBLICATIONS

Tap or Release Firing mode . . . what is it! Is it better? By VRYEEEZY on May 27, 2018 to YouTube (https://www.youtube.com/watch?v=D-g9alt38ZM) (Year: 2018).*

(Continued)

*Primary Examiner* — Peter J Iannuzzi
(74) *Attorney, Agent, or Firm* — Morgan, Lewis & Bockius LLP

(57) ABSTRACT

Embodiments of this application disclose an operation control method and apparatus, an electronic device, and a storage medium. The method includes: displaying a target button in a graphics user interface of a game application, the target button corresponding to a display mode switching function and a shooting function; determining a type of a virtual item controlled by a current virtual object in the game application; detecting a touch operation on the target button; in response to the detecting, determining a to-be-triggered target function in the display mode switching function and the shooting function and a target mode corresponding to the target function, according to the type of the virtual item controlled by the current virtual object; and performing the target function in the graphics user interface based on the target mode.

20 Claims, 10 Drawing Sheets

(51) Int. Cl.
  *A63F 13/837* (2014.01)
  *G06F 3/04815* (2022.01)
  *G06F 3/04883* (2022.01)
(52) U.S. Cl.
  CPC ...... *G06F 3/04815* (2013.01); *G06F 3/04883* (2013.01); *A63F 2300/1068* (2013.01); *A63F 2300/8076* (2013.01)
(58) Field of Classification Search
  CPC .. A63F 13/218; A63F 13/211; A63F 13/2145; A63F 13/22; A63F 13/422; A63F 13/53; A63F 13/219; A63F 13/42; A63F 13/52; A63F 13/426; A63F 13/428; G06F 3/04815; G06F 3/04883; G06F 3/04817; G06F 3/04847
  See application file for complete search history.

(56) References Cited

U.S. PATENT DOCUMENTS

| | | |
|---|---|---|
| 2014/0243058 A1 | 8/2014 | Tsuchiya et al. |
| 2014/0274239 A1 | 9/2014 | Han |
| 2016/0171835 A1 | 6/2016 | Washington et al. |
| 2019/0091561 A1 | 3/2019 | Li |

FOREIGN PATENT DOCUMENTS

| | | | |
|---|---|---|---|
| CN | 106959812 | A | 7/2017 |
| CN | 108525294 | A | 9/2018 |
| CN | 108553891 | A | 9/2018 |
| CN | 108635858 | A | 10/2018 |
| CN | 108771863 | A | 11/2018 |
| CN | 109091869 | A | 12/2018 |
| CN | 109589601 | A | 4/2019 |
| CN | 110141869 | A | 8/2019 |
| JP | 5727655 | B1 | 6/2015 |
| JP | 2017201513 | A | 11/2017 |
| JP | 2022509295 | A | 1/2022 |
| JP | 7231737 | B2 | 3/2023 |
| KR | 20180116870 | A | 10/2018 |
| RU | 2652428 | C2 | 4/2018 |

OTHER PUBLICATIONS

Tencent Technology, Australian Office Action, AU Patent Application No. 2020256524, Aug. 30, 2023, 5 pgs.
Tencent Technology, AU Office Action, Australian Patent Application No. 2020256524, Aug. 30, 2022, 4 pgs.
Chijiyouxi Xiaoxiazi , "Stimulate the Battlefield: the New Version Will Update the Firing Method, this Setting Allows the Handicapped Party to Eat Chicken!", Eating Chicken Game Little Blind Boy, Mar. 18, 2019, Retrieved from the Internet: https://baijiahao.baidu.com/s?id=1628346935618351582&wfr=spider&for=pc.
"Player Unknown's Battlegrounds Stimulate the Battlefield How to Adjust the Shooting Position", Mar. 17, 2019, Retrieved from the Internet: https://jingyan.baidu.com/article/d3b74d6438c0d81f77e609bd.html.
"Stimulate the Battlefield with a Key to Open the Mirror and Fire How to Set", Baidu Jingyan, Mar. 19, 2019, Retrieved from the Internet: https://jinyan.baidu.com/article/6dad50754008d7a123e36ef7.html.
Waiyou Club, "Stimulate the Battlefield: The Official Emergency Removal, Because of This Feature, Players Complained, 2 Refers to the Player's Gospel!", Mar. 21, 2019, Retrieved from the Internet: https://baijiahao.baidu.com/s?id=1628599317337006223&wfr=spider&for=pc.
Tencent Technology, ISR, PCT/CN2020/079706, Jun. 15, 2020, 3 pgs.
Tencent Technology (Shenzhen) Company Limited, Vietnamese Office Action, VN Patent Application No. 1-2021-06541, Sep. 20, 2023, 3 pgs.
Tencent Technology, Canadian Office Action, CA Patent Application No. 3,132,897, Nov. 3, 2023, 5 pgs.
Tencent Technology, Australian Office Action, AU Patent Application No. 2020256524, Jun. 20, 2023, 4 pgs.
Tencent Technology, SG Office Action, Singapore Patent Application No. 11202104911T, Sep. 15, 2022, 11 pgs.
The Entertainment World of Black Handsome, "Stimulate the Battlefield: Updated One-Click to Open the Mirror to Fire, More Convenient", iQIYI, 2 pgs., Retrieved from the Internet: https://www.iqiyi.com/w_19s6j5w8ch.html#curid=36225598509_47d411cd3b7ab491d2ac263c5a27b0ee.
GameWith, "Wilderness Action, Explain 'Instantaneous Kill Mode!' Take Advantage of Important Sniper Techniques!", Apr. 7, 2019, 8 pgs., Retrieved from the Internet: https://web.archive.org/web/20190407044505/https://gamewith.jp/knives-out/article/show/109698.
PUBG Mobile, "Introducing Recommended Button Layout for iPad (4 Fingers)", Compri.jp, Feb. 9, 2019, 10 pgs., Retrieved from the Internet: https://compri.jp/pubg-button-setup/.
Knives Out Live, "Wilderness Behavior; Loss if You Don't Know !! Explanation of the Advantages of Using 'Instantaneous Kill Mode!' If You Can Master It, SR Musou is Natural!? " YouTube, Apr. 20, 2018, 4 pgs., Retrieved from the Internet: https://www.youtube.com/watch?v=AmDJSeQuyOg.
Powerbang, "Godlike Aim in PUBG Mobile! Full Settings Walk Through!", YouTube video, 3 pgs., Retrieved from the Internet: https://www.youtube.com/watch?v=F2N674y4Fa4.
Tencent Technology, RU Office Action, Russian Federation Patent Application No. 2021126765/28(056488), Jul. 21, 2022, 21 pgs.
Tencent Technology, RU Search Report, Russian Federation Patent Application No. 2021126765/28(056488), Jul. 18, 2022, 4 pgs.
Tencent Technology, WO, PCT/CN2020/079706, Jun. 15, 2020, 5 pgs.
Tencent Technology, IPRP, PCT/CN2020/079706, Sep. 28, 2021, 6 pgs.
Derek G, "PUBG Mobile Settings Tutorial—How to Setup the Game / What Every Option Does" YouTube, Mar. 30, 2018, 1 pg., Retrieved from the Internet: https://www.youtube.com/watch?v=anYS2nSGhRU.
Tencent Technology, KR Office Action, Korean Patent Application No. 10-2021-7017252, Feb. 9, 2023, 6 pgs.
Tencent Technology, AU Office Action, Australian Patent Application No. 2020256524, Feb. 23, 2023, 4 pgs.
Bnatesgamer, "Call of Duty Mobile—Controls / Settings!" YouTube, Feb. 22, 2019, 4 pgs., Retrieved from the Internet: https://youtu.be/ifuK5DYXA61.
Tencent Technology, CA Office Action, Canadian Patent Application No. 3,132,897, Nov. 29, 2022, 9 pgs.
The RyOs, "How to PEEK (lean) in PUBG Mobile", YouTube, Jun. 28, 2018, 3 pgs., Retrieved from the Internet: https://youtu.be/eRzY5dpPrjA.
Vryeeezy, "Tap or Release Firing mode . . . what is it! Is it better?", You Tube, May 27, 2018, 2 pgs., Retrieved from the Internet: https://youtu.be/D-g9alt38ZM.
Tencent Technology, Singaporean Office Action, SG Patent Application No. 11202104911T, Jan. 22, 2024, 7 pgs.

\* cited by examiner

OPERATION CONTROL METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2020/079706, entitled "OPERATION CONTROL METHOD AND APPARATUS, ELECTRONIC DEVICE, AND STORAGE MEDIUM" and filed on Mar. 17, 2020, which claims priority to Chinese Patent Application No. 201910290727.0 filed with the China National Intellectual Property Administration on Apr. 11, 2019 and entitled "OPERATION CONTROL METHOD AND APPARATUS, ELECTRONIC DEVICE, AND STORAGE MEDIUM", both of which are incorporated herein by reference in their entirety.

FIELD OF THE TECHNOLOGY

This application relates to the field of computer technologies, and in particular, to an operation control method and apparatus, an electronic device, and a storage medium.

BACKGROUND OF THE DISCLOSURE

With development of computer technologies and diversification of terminal functions, there are increasingly more types of games that can be played on a terminal. For example, a shooting game may be played on the terminal.

Currently, in an operation control method corresponding to a game, a corresponding function is generally implemented according to a user operation. For example, when an attack operation is received, a virtual object is controlled to perform an attack. However, usually, an operation process is cumbersome and complex, and operation control efficiency is low. Therefore, an operation control method is urgently needed to resolve the foregoing problem that the operation process is cumbersome and complex, and efficiency is low:

SUMMARY

According to various embodiments provided in this application, an operation control method and apparatus, an electronic device, and a storage medium are provided.

According to one aspect, an operation control method is provided, and is performed by an electronic device, the method including:
  displaying a target button in a graphics user interface of a game application, the target button corresponding to a display mode switching function and a shooting function;
  determining a type of a virtual item controlled by a current virtual object in the game application;
  detecting a touch operation on the target button;
  in response to the detecting, determining a to-be-triggered target function in the display mode switching function and the shooting function and a target mode corresponding to the target function according to the type of the virtual item; and
  performing the target function in the graphics user interface based on the target mode.

According to one aspect, an operation control method is provided, and is performed by an electronic device, the method including:
  displaying a target button in a graphics user interface, the target button corresponding to a plurality of control functions, and the plurality of control functions including at least two of a display mode switching function, a shooting function, an action control function, or a viewing angle adjustment function;
  determining a to-be-triggered target function in the plurality of control functions and a target mode corresponding to the target function, according to at least one of a type of a virtual item controlled by a current virtual object, a motion status of the current virtual object, or an environment for the current virtual object in a virtual scene, when a touch operation on the target button is detected; and
  performing the target function in the graphics user interface based on the target mode.

According to one aspect, an operation control apparatus is provided, the apparatus including:
  a display module, configured to display a target button in a graphics user interface of a game application, the target button corresponding to a display mode switching function and a shooting function;
  a determining module, configured to determine a to-be-triggered target function in the display mode switching function and the shooting function and a target mode corresponding to the target function, according to a type of a virtual item controlled by a current virtual object, when a touch operation on the target button is detected; and
  an execution module, configured to perform the target function in the graphics user interface based on the target mode.

According to one aspect, an operation control apparatus is provided, the apparatus including:
  a display module, configured to display a target button in a graphics user interface, the target button corresponding to a plurality of control functions, and the plurality of control functions including at least two of a display mode switching function, a shooting function, an action control function, or a viewing angle adjustment function;
  a determining module, configured to determine a to-be-triggered target function in the plurality of control functions and a target mode corresponding to the target function, according to at least one of a type of a virtual item controlled by a current virtual object, a motion status of the current virtual object, or an environment for the current virtual object in a virtual scene, when a touch operation on the target button is detected; and
  an execution module, configured to perform the target function in the graphics user interface based on the target mode.

According to one aspect, an electronic device is provided, the device including a memory and a processor, the memory storing computer-readable instructions, and the computer-readable instructions, when executed by the processor, causing the processor to perform steps of the foregoing operation control methods.

According to one aspect, one or more non-transitory storage media storing computer-readable instructions are provided, and the computer-readable instructions, when executed by one or more processors, causing the one or more processors to perform steps of the foregoing operation control methods.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
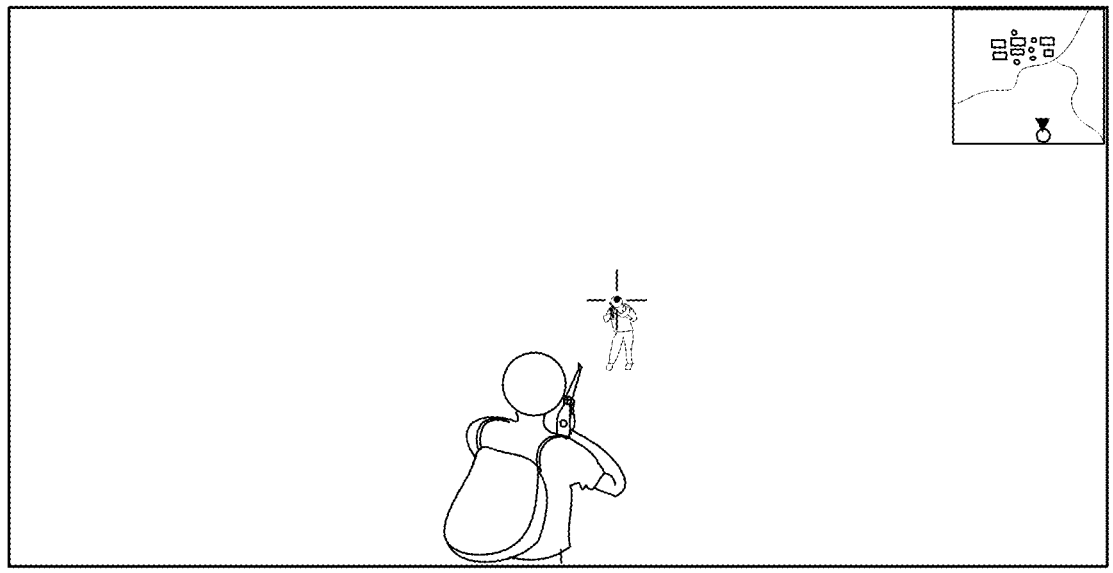
FIG. 1 is a schematic diagram of a display mode of a virtual scene according to an embodiment of this application.

To make objectives, technical solutions, and advantages of this application clearer, the following further describes implementations of this application in detail with reference to the accompanying drawings.

Embodiments of this application mainly relate to a video game scene or a simulation training scene. Using the video game scene as an example, a user may perform an operation on a terminal in advance. After detecting the operation of the user, the terminal may download a game configuration file of the video game, where the game configuration file may include an application program, interface display data, virtual scene data, or the like of the video game, so that the user can invoke the game configuration file while logging in to the video game on the terminal, to render and display an interface of the video game. The user may perform a touch operation on the terminal. After detecting the touch operation, the terminal may determine game data corresponding to the touch operation and render and display the game data. The game data may include virtual scene data, behavioral data of a virtual object in the virtual scene, and the like.

The virtual scene in this application may be used for simulating a three-dimensional virtual space or a two-dimensional virtual space. The three-dimensional virtual space or the two-dimensional virtual space may be an open space. The virtual scene may be used for simulating a real environment in a real world. For example, the virtual scene may include the sky, the land, the ocean, or the like. The land may include environment elements such as the desert and a city. The user may control the virtual object to move in the virtual scene. The virtual object may be a virtual image used for representing the user, or may be a virtual image used for representing a creature in association with the user, for example, a pet. The virtual image may be in any type of form, for example, a human or an animal. This is not limited in this application.

The virtual scene may further include another virtual object. The virtual scene may include a plurality of virtual objects, where each virtual object has a shape and a volume of the virtual object in the virtual scene, and occupies a part of the space in the virtual scene. For example, in a shooting game, the user may control the virtual object to fall freely, glide, open a parachute to fall, or the like in the sky of the virtual scene, or run, jump, crawl, bend forward, or the like on the land, or swim, float, dive, or the like in the ocean. Certainly, the user may alternatively control the virtual object to drive a vehicle to move in the virtual scene. Herein, the foregoing scene is merely used as an example for description, and this is not limited in the embodiments of this application. The user may alternatively control the virtual object to fight against another virtual object by using a virtual item, and the virtual item may be a cold weapon, or may be a hot weapon. This is not limited in the embodiments of this application.

Generally, a terminal screen display's a picture from a viewing angle of a virtual object currently controlled by a terminal. The terminal screen may further display an aiming point of the virtual object currently controlled by the terminal. The aiming point may be used for annotating an aiming target in the picture from the viewing angle of the virtual object currently controlled by the terminal. In this case, a position of the aiming point in the virtual scene may be used as an attack point of the virtual object currently controlled by the terminal.

The aiming point may be displayed at a center position of the terminal screen. Certainly, the aiming point may also be displayed at another position, which is not limited in the embodiments of this application. The aiming point may have a plurality of display styles. In this case, the aiming point may be displayed in a display style default by a system, or may be adjusted according to a user setting. When seeing the aiming point displayed on the terminal, the user may determine whether a position currently corresponding to the aiming point in the virtual scene is an area at which the user wants to aim. If not, the user may adjust a viewing angle of the virtual scene by performing a viewing angle adjustment operation, to adjust the area aimed at by the aiming point. Certainly, the user generally wants to adjust the aiming point to the body of another virtual object in the virtual scene quickly and accurately, to perform shooting, slapping, or boxing on the other virtual object.

The viewing angle adjustment operation may include a plurality of operation manners. In one implementation, the viewing angle adjustment operation may be a sliding operation. When detecting the sliding operation, the terminal may determine a rotation direction, a rotation angle, and a rotation speed of a viewing angle corresponding to the sliding operation based on a sliding direction, a sliding distance, and a sliding speed of the sliding operation. For example, the sliding direction of the sliding operation may correspond to the rotation direction of the viewing angle, and the sliding distance of the sliding operation may be positively correlated to the rotation angle of the viewing angle. Certainly, the sliding speed of the sliding operation may also be positively correlated to the rotation speed of the viewing angle.

In another implementation, the viewing angle adjustment operation may alternatively be a rotation operation on the terminal. When detecting the rotation operation, an angular velocity sensor (for example, a gyroscope) in the terminal may determine a rotation direction, a rotation angle, and a rotation speed of the viewing angle according to a rotation direction, a rotation angle, and a rotation speed of the rotation operation. For example, the rotation direction of the rotation operation may be the rotation direction of the viewing angle, the rotation angle of the rotation operation may be positively correlated to the rotation angle of the viewing angle, and the rotation speed of the rotation operation may be positively correlated to the rotation speed of the viewing angle. Certainly, the viewing angle adjustment operation may alternatively be a key operation, a drag operation on a virtual joystick area, a toggle operation on a real joystick device, or the like. This is not limited in this application.

Certainly, the viewing angle adjustment operation may further include another manner, for example, a gesture operation. This is not limited in the embodiments of this application. When controlling the virtual object, the user may further combine the foregoing several viewing angle adjustment operations, to implement different control effects. For example, a viewing angle adjustment operation performed by the user for the viewing angle is a sliding operation, and when the sliding operation is performed, the terminal detects a press strength of the operation in the sliding operation process. In this case, the terminal decides whether to perform shooting or the like depending on whether the press strength is greater than a preset press strength. The foregoing is merely an exemplary description. How to combine the foregoing several viewing angle adjustment operations during specific implementation and a control effect that can be implemented are not limited in this application herein.

In the foregoing video game scene, the virtual object may generally control a virtual item to fight against another virtual object. Some firearm items may be further equipped with a sight, so that the virtual scene is observed based on the sight. The sight may be a mechanical sight, and the mechanical sight refers to an observation device originally equipped on the firearm item. The sight may alternatively be a sight subsequently equipped on the firearm item, for example, a sight scope. The sight scope may be provided with a magnification, and the magnification may be 1, or may be a value greater than 1. For example, the sight scope may be a red dot sight scope, a holographic sight scope, a 2× sight scope, a 4× sight scope, an 8× sight scope, or the like, where magnifications of the red dot sight scope and the holographic sight scope are both 1, and magnifications of the 2× sight scope, the 4× sight scope, and the 8× sight scope are all greater than 1. Certainly, the magnification of the sight scope may alternatively be another value. For example, the sight scope may alternatively be a 3× sight scope, a 6× sight scope, a 15× sight scope, or the like, and the magnification of the sight scope is not limited in the embodiments of this application.

Figure 2:
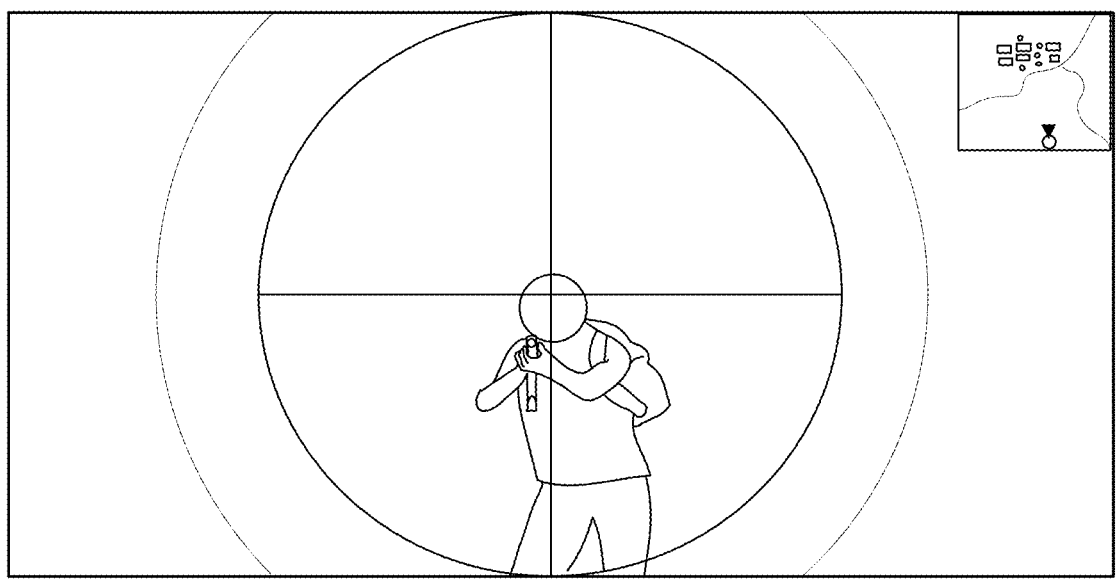
FIG. 2 is a schematic diagram of a display mode of a virtual scene according to an embodiment of this application.

Generally, the sight is used for assisting the virtual object in performing aiming and shooting. Therefore, when the virtual object controls the virtual item to perform aiming or shooting, a display mode of the virtual scene may be switched to a sight-based display mode, to facilitate more accurate aiming and shooting on an enemy virtual object. For example, as shown in FIG. 1, a virtual scene is not in a sight-based display mode, but in a first display mode. As shown in FIG. 2, if wanting to control a virtual object to accurately shoot another virtual object appearing in a virtual scene, a user switches a display mode of the virtual scene to a sight-based display mode, to observe the virtual scene through a sight on a virtual item controlled by the virtual object.

Figure 3:
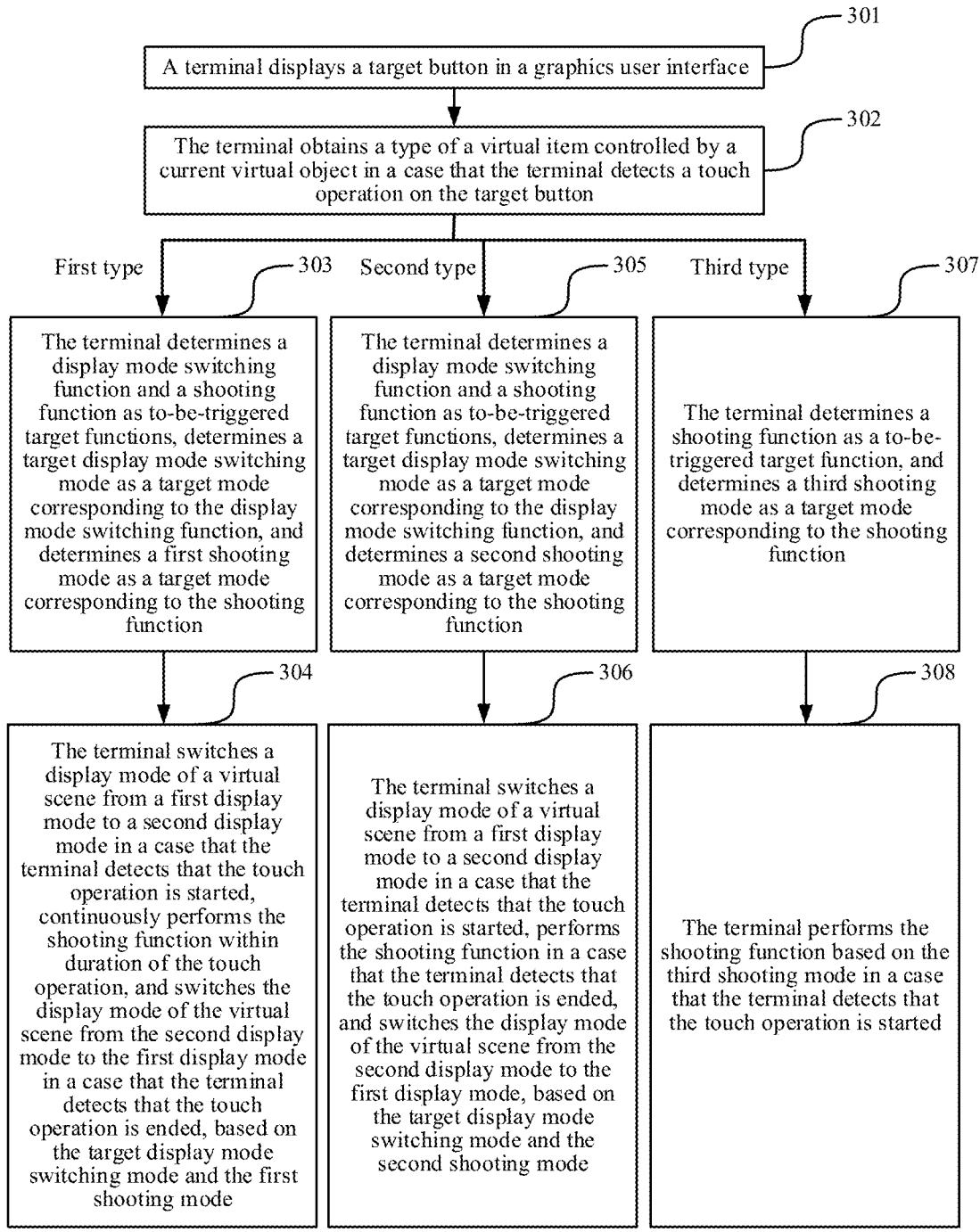
FIG. 3 is a flowchart of an operation control method according to an embodiment of this application.

FIG. 3 is a flowchart of an operation control method according to an embodiment of this application. The method may be applied to an electronic device. The electronic device may be provided as a terminal or may be provided as a server. This is not limited in this embodiment of this application. In the following embodiments, an example in which the operation control method is performed by the terminal is merely used for description. Referring to FIG. 3, the method may include the following steps:

301: The terminal displays a target button in a graphics user interface of a game application, the target button corresponding to a display mode switching function and a shooting function.

In this embodiment of this application, the terminal may provide an operation control function, and the terminal may provide a target button, where the target button may correspond to a plurality of control functions. A user may perform one touch operation on the target button, to implement the plurality of control functions. The target button, for example, may correspond to the display mode switching function and the shooting function.

A method in which the terminal provides the target button may be as follows: The terminal may display the target button in the graphics user interface, so that the user can perform a touch operation on the target button. When the terminal displays the target button, at least one of step 1 to step 3 may be used for implementation:

Step 1: The terminal displays the target button at a target position in the graphics user interface.

Step 2: The terminal displays the target button in the graphics user interface according to a target size.

Step 3: The terminal displays the target button in the graphics user interface according to target transparency.

That is, a display status of the target button may include at least one display parameter. The at least one display parameter may include at least one of a display position, a size, or transparency. The display position of the target button is the target position, the size is the target size, and the transparency is the target transparency. The display status of the target button may be flexibly changed based on a setting of the at least one display parameter, to meet an actual requirement.

Figure 4:
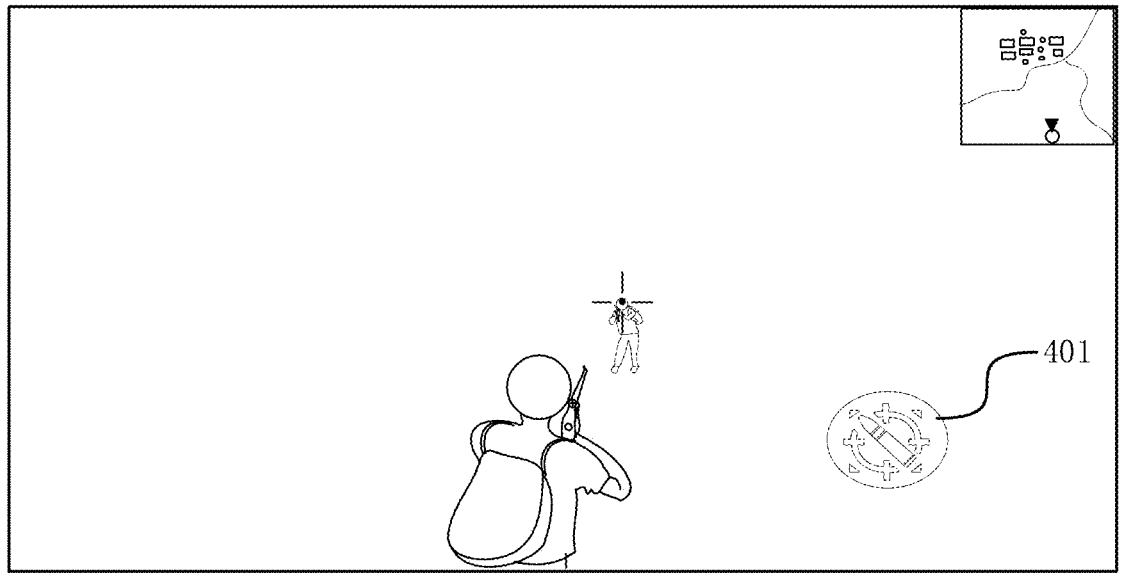
FIG. 4 is a schematic diagram of a display interface of a target button according to an embodiment of this application.

In one implementation, at least one of the target position, the target size, and the target transparency may be set by a person skilled in the art according to a requirement. This is not limited in this embodiment of this application. For example, the target position may be determined according to a touch position between a user hand and a terminal screen when the user holds the terminal and may fall within a present range of the touch position. For example, the target position may be set as a position relatively easily tapped by the user, to reduce complexity of a user operation. For example, as shown in FIG. 4, a target position of a target button 401 may be a position on a lower right area of a graphics user interface. Fingers of a user are exactly located at the position when the user holds a terminal. The target size may be set relatively small, and the target transparency may be set relatively large. In this way, the target button can be enabled not to block the graphics user interface too much. That is, the target size may be less than a normal button size, and the target transparency may be greater than normal transparency. The normal button size is an average size of buttons, and the normal transparency is general button transparency or the normal transparency may be 0. These may all be set by a person skilled in the art according to a requirement. This is not limited in this embodiment of this application.

Target prompt information may be further displayed on the target button. The target prompt information is used for providing a prompt indicating that the target button has a display mode switching function and a shooting control function at the same time. For example, patterns of an aiming point and a bullet may be displayed in the target button. In this way, the prompt can be provided that the target button may provide the display mode switching function and the shooting control function at the same time.

In another implementation, at least one of the target position, the target size, and the target transparency may be further set by the user according to a use habit of the user in a customized manner. The terminal may provide a configuration interface, and the user may perform a customized set in the configuration interface, to change the display status of the target button. A setting process of the display status may be implemented in at least one step of step 1 to step 3:

Step 1: The terminal obtains position adjustment information of the target button based on the configuration interface, and obtains the target position of the target button based on the position adjustment information.

Step 2: The terminal obtains size adjustment information of the target button based on the configuration interface, and obtains the target size of the target button based on the size adjustment information.

Step 3: The terminal obtains transparency adjustment information of the target button based on the configuration interface, and obtains the target transparency of the target button based on the transparency adjustment information.

Figure 5:
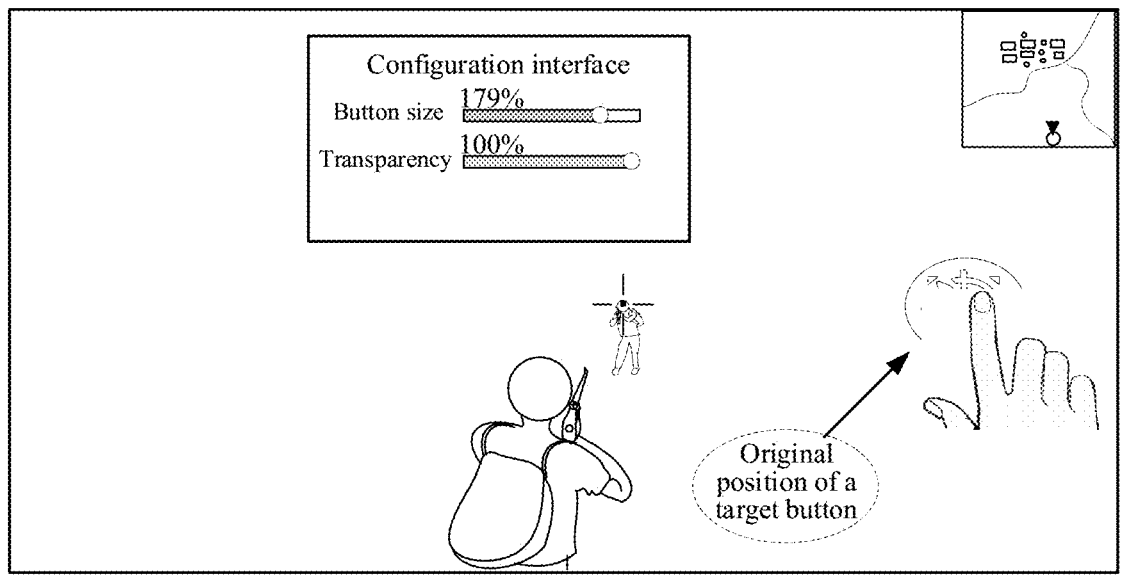
FIG. 5 is a schematic diagram of a configuration interface according to an embodiment of this application.

For example, as shown in FIG. 5, the configuration interface may be provided with a display parameter adjustment option of the target button. The display parameter adjustment option is: a button size (size), transparency, and the target button. The user may perform an operation on the display parameter adjustment option, and the terminal may obtain corresponding adjustment information according to the operation, to adjust a display parameter of the target button based on the adjustment information. The user may adjust an adjustment bar of the button size, and the terminal may adjust a displayed size of the target button based on the adjustment operation performed on the adjustment bar by the user, to provide an adjustment preview effect. For example, "179%" in FIG. 5 represents that the size of the target button is a default size of 179%. Similarly, the user may also perform an adjustment operation on an adjustment bar of the transparency. For example, "100%" in FIG. 5 represents that the transparency of the target button is 100%. When adjusting the target position of the target button, the user may perform a drag operation on the target button for implementation, and the terminal may adjust the position of the target button based on the drag operation on the target button. For example, the position of the target button may change as a position of the drag operation changes. In FIG. 5, a position of a dashed line is an original position of the target button. When the drag operation on the target button is received, as the drag position changes, the target button moves, starting from the original position, with the drag position.

In one embodiment, the terminal may display the target button in the configuration interface, and the user may perform a selection operation on the target button. When detecting the selection operation on the target button, the terminal may display the display parameter adjustment option of the target button. In one implementation, the configuration interface may be further provided with another button, so that the user can further set a display parameter of the other button. This is not limited in this embodiment of this application.

In one implementation, a status of the operation control function may include an enabled state and a disabled state, and the user may set the status of the operation control function, to determine whether the user needs the terminal to provide the operation control function. When determining that the operation control function is in the enabled state according to configuration information, the terminal may perform the step of displaying a target button in a graphics user interface. That is, when determining that the operation control function is enabled, the terminal provides the operation control function. When determining that the operation control function is in the disabled state according to the configuration information, the terminal may not perform step 301.

Figure 6:
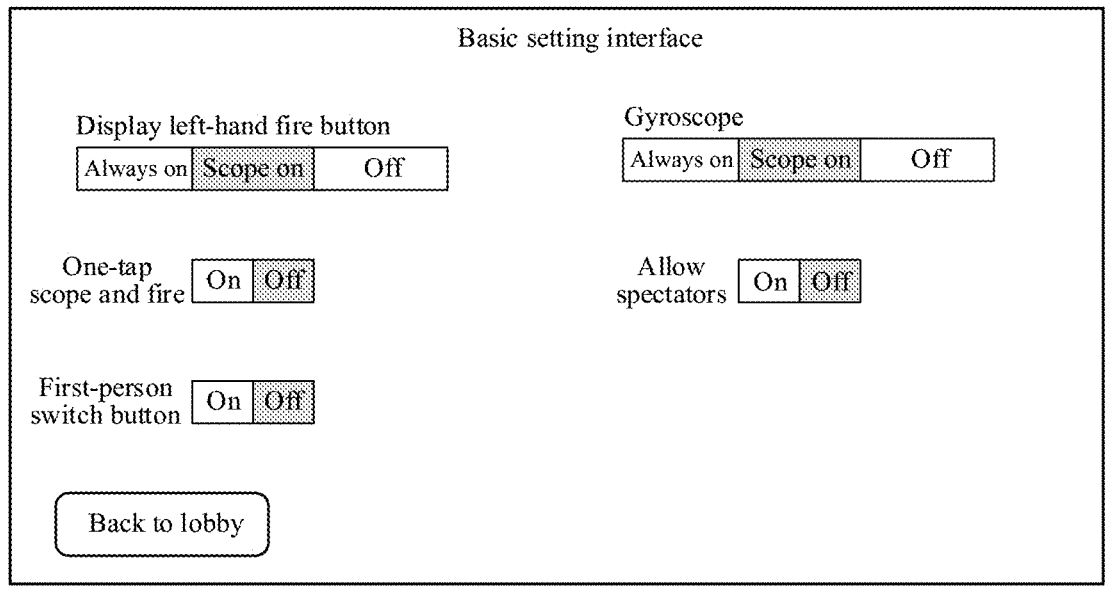
FIG. 6 is a schematic diagram of a function configuration interface according to an embodiment of this application.

When the terminal sets the status of the operation control function, a function configuration interface may be used for implementation. The terminal may set the status of the operation control function based on the function configuration interface and a status setting operation of the operation control function, that is, determine the configuration information of the operation control function based on the function configuration interface, to determine the status of the operation control function. The function configuration interface may be provided with a status setting option of the operation control function, for example, an on option and an off option. The user may perform a touch operation on the status setting option of the operation control function, to change the status of the operation control function. For example, as shown in FIG. 6, in a specific example, the target button may be referred to as a "one-tap scope and fire button", and on ("on") and off ("off") options may be set around the target button. The user may perform a selection operation on the on or off option, to change a use status of the target button, that is, change the status of the operation control function. If the user selects the on option, the operation control function is in the enabled state. If the user selects the off option, the operation control function is in the disabled state.

302: The terminal obtains a type of a virtual item controlled by a current virtual object when the terminal detects the touch operation on the target button, and if the type is a first type, performs step 303 and step 304, or if the type is a second type, performs step 305 and step 306, or if the type is a third type, performs step 307 and step 308.

When the target button is displayed in the graphics user interface, the user may perform the touch operation on the target button, so that the terminal can provide a corresponding operation control function based on the touch operation of the user. In this embodiment of this application, when the type of the virtual item controlled by the current virtual object vary, the operation control function provided by the terminal may also vary. Therefore, in step 302, the terminal may obtain the type of the virtual item controlled by the current virtual object, and further determine, according to the type, the operation control function needing to be provided. The type of the virtual item may be set by a person skilled in the art according to a requirement, or may be determined based on a name of the virtual item, or certainly may be set by the user according to the use habit of the user. This is not limited in this embodiment of this application.

In this embodiment of this application, the type of the virtual item may include the first type, the second type, and the third type. When the type of the virtual item varies, the terminal may separately perform two steps of step 303 to step 308. That is, when the type of the virtual item varies, a control function provided by the terminal may vary, and a mode of the provided control function may also vary. The mode is used for representing how to perform a corresponding function based on a touch operation. Herein, an example in which the type of the virtual item includes only three types is used for description. Certainly, the virtual item may further include a fourth type, and when the type of the virtual item is the fourth type, the terminal may alternatively perform another operation control function. The type of the virtual item is not limited in this embodiment of this application.

303: The terminal determines the display mode switching function and the shooting function as to-be-triggered target functions, determines a target display mode switching mode as a target mode corresponding to the display mode switching function, and determines a first shooting mode as a target mode corresponding to the shooting function.

After the terminal obtains the type of the virtual item, if the type is the first type, the terminal may perform step 303, and perform step 304 based on the determined target function and the corresponding target mode in step 303. When the type of the virtual item is the first type, the terminal may determine to trigger both the display mode switching function and the shooting function. The display mode of the virtual scene may include a first display mode and a second display mode. The second display mode may be a sight-based display mode, and the first display mode may be a display mode different from the second display mode. The display mode switching function refers to switching the display mode of the virtual scene.

The terminal may further separately determine the target modes of the display mode switching function and the shooting function. The terminal determines the target mode corresponding to the display mode switching function as the target display mode switching mode, and the target mode corresponding to the shooting function as the first shooting mode. The target modes of the display mode switching function and the shooting function are used for representing how to perform corresponding target functions at different stages of the touch operation. The touch operation may include a plurality of stages: when the touch operation is started, duration of the touch operation, and when the touch operation is ended.

In one implementation, the virtual item of the first type may include a plurality of shooting types. The virtual item of the first type may include a first shooting type and a second shooting type. For example, the first shooting type may be an automatic shooting type, and the second shooting type may be a single-shot shooting type. Certainly, the virtual item of the first type may further include a shooting mode. For example, the virtual item of the first type may include the first shooting type, namely, the automatic shooting type. For details, refer to step 304, and an excessive description is not provided herein in this embodiment of this application.

304: The terminal switches the display mode of the virtual scene from the first display mode to the second display mode when the terminal detects that the touch operation is started, continuously performs the shooting function within the duration of the touch operation, and switches the display mode of the virtual scene from the second display mode to the first display mode when the terminal detects that the touch operation is ended, based on the target display mode switching mode and the first shooting mode.

After determining the target function and the corresponding target mode, the terminal may perform the corresponding target function based on the target mode and the touch operation. For example, the target display mode switching mode is used for representing that the display mode of the virtual scene is to be switched from the first display mode to the second display mode when the touch operation is started, and the display mode of the virtual scene is to be switched from the second display mode to the first display mode when the touch operation is ended. The first shooting mode is used for representing that the shooting function is to be continuously performed within the duration of the touch operation. Therefore, the terminal may perform step 304, to implement the display mode switching function and the shooting function.

Figure 7:
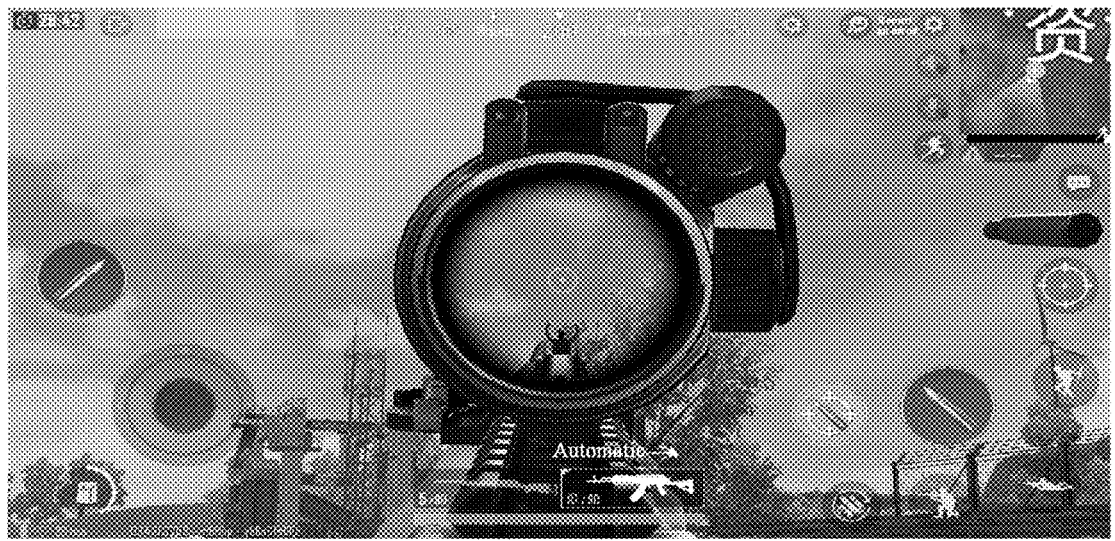
FIG. 7 is a schematic diagram of an interface in a process of performing a target function when a type of a virtual item is a first type according to an embodiment of this application.

For example, an example in which the touch operation is a long-press operation is used for description herein. An example in which the virtual item is a marksman rifle having an automatic shooting type is used. The user may perform the long-press operation on the target button. When the long-press operation is started, the terminal may switch the display mode of the virtual scene from the first display mode to the second display mode (the sight-based display mode). As shown in FIG. 7, a display mode of the virtual scene in FIG. 7 is the second display mode, that is, the sight-based display mode. During the long-press operation, the terminal may continuously perform the shooting function. When the user ends the long-press operation, the terminal may stop performing the shooting function, and switch the display mode of the virtual scene from the second display mode to the first display mode. Herein, a process of switching the display mode from the first display mode to the second display mode is referred to as "open the scope", and a process of switching the display mode from the second display mode to the first display mode is referred to as "close the scope". Therefore, in step 304, when detecting that the touch operation is started, the terminal may open the scope and perform continuous shooting; when the touch operation is ended, the terminal stops shooting and closes the scope. The user needs to press only one target button to complete an operation procedure of "open the scope-shoot-close the scope". This greatly speeds up aiming and shooting, and improves experience of the user in case of emergency.

In a video game, in an urgent battle, a player often does not have enough time to perform a plurality of operations to complete both display mode switching and shooting. Consequently, the player may easily fall behind in exchange of fire and a failure is caused. However, in this embodiment of this application, a display mode switching (aiming) and shooting procedure can be quickly completed by performing one operation on the target button, and because the operation on the button is simple and easy to implement, game experience of the player can be effectively improved.

In one implementation, the virtual item of the first type may include a plurality of shooting types, and when the shooting type varies, a mode of the operation control function needing to be performed by terminal may also vary. Therefore, if the type of the virtual item is the first type, the terminal may obtain a current shooting type of the virtual item, and determine how to further perform the operation control function based on the shooting type. Two shooting types are used as an example for description below:

When the shooting type is the first shooting type, the terminal may perform step 303, that is, perform the step of determining the display mode switching function and the shooting function as to-be-triggered target functions, determining a target display mode switching mode as a target mode corresponding to the display mode switching function, and determining a first shooting mode as a target mode corresponding to the shooting function. Certainly, the terminal may further perform step 304. The first shooting type may be used for representing that the virtual item may perform continuous shooting based on one operation. For example, the first shooting type may be referred to as the automatic shooting type. In this case, when the shooting type of the virtual item is the first shooting type, the terminal may perform step 303 and step 304.

When the shooting type is the second shooting type, the terminal may determine the display mode switching function and the shooting function as to-be-triggered target functions, determine the target display mode switching mode as the target mode corresponding to the display mode switching function, and determine a second shooting mode as a target mode corresponding to the shooting function. The second shooting type may be used for representing that the virtual item performs shooting once based on one operation. For example, the second shooting type may be referred to as a single-shot shooting type. In this case, when the shooting type of the virtual item is the second shooting type, the virtual item cannot perform continuous shooting within the duration of the touch operation. Different from step 303, the terminal may determine the target mode corresponding to the shooting function as the second shooting mode. Therefore, in step 304, a case of performing the shooting function by the terminal may also be different. The scope may be opened when the touch operation is started, and shooting may be performed and the scope may be closed when the touch operation is ended.

Certainly, in another implementation, the terminal may not obtain the shooting type of the virtual item. When the shooting type is the first shooting type or the second shooting type, step 303 and step 304 are performed. That is, the shooting type of the virtual item is not used as a reference factor for the shooting mode. A specific manner is not limited in this embodiment of this application.

Step 303 and step 304 are operation control steps needing to be performed by the terminal when the type of the virtual item is the first type. If the type is the second type, the terminal may perform step 305 and step 306. If the type is the third type, the terminal may perform step 307 and step 308.

305: The terminal determines the display mode switching function and the shooting function as to-be-triggered target functions, determines the target display mode switching mode as a target mode corresponding to the display mode switching function, and determines a second shooting mode as a target mode corresponding to the shooting function.

After step 302, after the terminal obtains the type of the virtual item, if the type is the second type, the terminal may perform step 305, and perform step 306 based on the determined target function and the corresponding target mode in step 305.

When the type of the virtual item is the second type, the terminal may determine to trigger both the display mode switching function and the shooting function. The terminal may further separately determine target modes of the display mode switching function and the shooting function. The terminal determines a target mode corresponding to the display mode switching function as the target display mode switching mode, and a target mode corresponding to the shooting function as the second shooting mode. The target modes of the display mode switching function and the shooting function are used for representing how to perform corresponding target functions at different stages of the touch operation.

In one implementation, the virtual item of the second type may include the second shooting mode, and the second shooting mode is used for representing that the virtual item performs shooting once based on one operation. In this way, the second shooting mode of the virtual item of the second type may be similar to the second shooting mode used when the virtual item of the first type is in the second shooting type in step 304, which is referred to as a single-shot shooting type herein.

306: The terminal switches the display mode of the virtual scene from the first display mode to the second display mode when the terminal detects that the touch operation is started, performs the shooting function when the terminal detects that the touch operation is ended, and switches the display mode of the virtual scene from the second display mode to the first display mode, based on the target display mode switching mode and the second shooting mode.

After determining the target function and the corresponding target mode, the terminal may perform the corresponding target function based on the target mode and the touch operation. Specifically, the target display mode switching mode is similar to that in step 304, and the second shooting mode is used for representing that the shooting function is to be performed when the touch operation is ended. Therefore, the terminal performs step 306, to implement the display mode switching function and the shooting function.

Figure 8:
FIG. 8 is a schematic diagram of an interface after a target function is performed when a type of a virtual item is a second type according to an embodiment of this application.

For example, an example in which the touch operation is a long-press operation is used for description herein. An example in which the virtual item controlled by the virtual object is a sniper rifle is used. The user may perform the long-press operation on the target button. When the long-press operation is started, the terminal may switch the display mode of the virtual scene from the first display mode to the second display mode (the sight-based display mode). When the user ends the long-press operation, the terminal may stop performing the shooting function, and switch the display mode of the virtual scene from the second display mode to the first display mode. Herein, a process of switching the display mode to the sight-based display mode is referred to as "open the scope", and a process of switching the display mode from the sight-based display mode to the first display mode is referred to as "close the scope". As shown in FIG. 8, in step 306, when detecting that the touch operation is started, the terminal may open the scope: when the touch operation is ended, the terminal performs shooting and closes the scope. FIG. 8 shows only a virtual scene after "close the scope" is performed when a touch operation is ended, but does not show another process. A display mode of the virtual scene is a sight-based display mode. For the sight-based display mode, refer to FIG. 7.

Step 305 and step 306 are operation control steps needing to be performed by the terminal when the type of the virtual item is the second type. If the type is the third type, the terminal may perform step 307 and step 308.

307: The terminal determines the shooting function as a to-be-triggered target function, and determines a third shooting mode as a target mode corresponding to the shooting function.

After step 302, after the terminal obtains the type of the virtual item, if the type is the third type, the terminal may perform step 307, and perform step 308 based on the determined target function and the corresponding target mode in step 307.

When the type of the virtual item is the third type, the terminal may trigger the shooting function, but may not trigger the display mode switching function. Therefore, the terminal may further determine the target mode of the shooting function, that is, the third shooting mode. The third shooting mode is used for representing a stage that is of the touch operation and at which the shooting function is to be performed.

308: The terminal performs the shooting function based on the third shooting mode when the terminal detects that the touch operation is started.

After determining the target function and the corresponding target mode, the terminal may perform the corresponding target function based on the target mode and the touch operation. In step 308, the terminal may perform the shooting function based on the third shooting mode. In one implementation, the third target mode is used for representing that a shooting function is to be performed when the touch operation is started. Therefore, the terminal performs step 308, to implement the shooting mode.

Figure 9:
FIG. 9 is a schematic diagram of an interface in a process of performing a target function when a type of a virtual item is a third type according to an embodiment of this application.

For example, an example in which the touch operation is a tap operation is used for description herein. An example in which the virtual item controlled by the virtual object is a designated marksman rifle that does not have an automatic shooting type is used. The user may perform the tap operation on the target button. When the tap operation is started, the terminal may perform the shooting function. If the touch operation is a long-press operation, when the touch operation is started, the terminal may perform the shooting function until the touch operation is ended: when the touch operation is ended, the terminal may no longer perform the shooting function. As shown in FIG. 9, in step 308, the terminal may perform shooting when detecting that the touch operation is started. In an operation process of the touch operation, the terminal may not perform the foregoing "open the scope" and "close the scope" process.

When step 302, step 303, step 305, and step 307 are a process of determining a to-be-triggered target function in the display mode switching function and the shooting function and a target mode corresponding to the target function, according to the type of the virtual item controlled by the current virtual object, when the touch operation on the target button is detected, step 304, step 306, and step 308 are a process of performing the target function in the graphics user interface based on the target mode. When the type of the virtual item varies, the terminal determines that the to-be-triggered target function and the corresponding target mode may vary, and in this case an operation control step needing to be performed by the terminal may also vary.

In the foregoing process, types of virtual items are classified. Different operation control procedures are provided for virtual items of different types, instead of using a same operation control procedure. In this way, discomfort does not occur on shooting feel of most firearms, a battle status is not affected, a case of risking big things for the sake of small ones is avoided, and an operation control procedure is flexible and easy to implement. This can meet requirements of different shooting scenarios. In addition, one target button is used to implement a plurality of operation control procedures, so that smooth operation experience is provided, and no operation pressure is brought to the user, but a user operation is simplified. In addition, the user may perform a customized setting according to a use habit of the user, and adjust a button function to a status that is most suitable for feel of the user, to improve user experience.

The foregoing merely provides a case in which the type of the virtual item includes the first type, the second type, and the third type. In one implementation, the virtual item may further include another type. The foregoing may each set by a person skilled in the art according to a requirement, or certainly may be set by the user according to the use habit of the user.

In one implementation, the terminal may provide an operation control function configuration interface. The operation control function configuration interface may include a control function option and a mode option, and the user may perform a selection operation in the control function option, and perform a setting operation in the mode option, so that the terminal may update a control function corresponding to the target button and a target mode corresponding to the control function based on the selection operation or the setting operation. Certainly, the operation control function configuration interface may further provide a virtual item type setting option, and the user may set a type of a virtual item in the type set option, or may set virtual items of each type. The foregoing may all set by the user according to the use habit of the user in a customized manner. This is not limited in this embodiment of this application.

In one implementation, in the procedure of the foregoing operation control method, the target button may be further used to provide a viewing angle adjustment function. When the user performs the touch operation on the target button, the terminal may further adjust a viewing angle of the virtual scene based on the touch operation. Specifically, the target button may further correspond to the viewing angle adjustment function. In step 302, 303, 305, and 307, the terminal may further determine the viewing angle adjustment function as the to-be-triggered target function, and determine a target viewing angle adjustment mode as a target mode corresponding to the viewing angle adjustment function, when the terminal detects the touch operation on the target button. In step 304, 306, and 308, the terminal may further adjust the viewing angle of the virtual scene based on an operation direction and an operation speed of the touch operation within duration of the touch operation and based on the target viewing angle adjustment mode.

In a specific embodiment, in the foregoing viewing angle adjustment process, a target rotation speed of a viewing angle of the virtual scene may be obtained based on the operation direction and the operation speed of the touch operation. The target rotation speed includes a direction and a value. The terminal may adjust the viewing angle of the virtual scene based on the target rotation speed.

For example, an example in which the touch operation is a combination of a long-press operation and a sliding operation is used for description. If the type of the virtual item is the first type, when the touch operation is started, the terminal may switch the display mode of the virtual scene from the first display mode to the second display mode, and continuously perform the shooting function within duration of the touch operation. When wanting to adjust the viewing angle, the user may press and slide the target button, or drag the target button, so that the terminal can perform viewing angle adjustment based on the operation direction and the operation speed. When the viewing angle of the virtual scene is adjusted, a position at which an aiming point aims in the virtual scene also changes, so that in the viewing angle adjustment process, the user can adjust an aiming position, and perform continuous shooting until the touch operation is ended. When the touch operation is ended, the terminal stops shooting and is switched back to the first display mode.

For another example, if the type of the virtual item is the second type, when the touch operation is started, the terminal switches the display mode of the virtual scene from the first display mode to the second display mode. During the touch operation, the user may adjust the viewing angle, to change an aiming position. After the adjustment, the user stops the touch operation. In this case, the terminal may shoot a position at which an aiming point currently aims and be switched back to the first display mode.

For another example, if the type of the virtual item is the third type, the terminal may perform shooting when the touch operation is started, and no longer perform shooting when the touch operation continues, but adjust the viewing angle based on the touch operation.

In one implementation, in the procedure of the foregoing operation control method, the target button may be further used to provide an action control function. When the user performs the touch operation on the target button, the terminal may further control, based on the touch operation, the virtual object to perform a corresponding action.

Specifically, the target button may further correspond to the action control function. In step 302, 303, 305, and 307, the terminal may further determine the action control adjustment function as the to-be-triggered target function, and determine a target action control mode as a target mode corresponding to the action control adjustment function, when the terminal detects the touch operation on the target button. In step 304, 306, and 308, the terminal may further perform any one of the following:

the terminal controls the current virtual object to perform a target action, when the terminal detects that the touch operation is started, based on the target action control mode; and the terminal controls the current virtual object to perform the target action, when the terminal detects that the touch operation is started, based on the target action control mode; and the terminal controls an action of the current virtual object to be restored to an action that is before the target action is performed, when the terminal detects that the touch operation is ended.

For example, the target action may be a sideways action, or a getting down action, a squatting down action, a jumping action, or the like. An example in which the target action is the sideways action is used. When the touch operation is started, the terminal may control the virtual object to move sideways, and perform another action in step 304, 306, or 308, or may perform the foregoing viewing angle adjustment step. When the touch operation is ended, the terminal may control the virtual object to be restored from a sideways state to a previous state again.

In another implementation, the procedure of the foregoing operation control method may further provide an action control function of a plurality of actions. When the user performs the touch operation on the target button, the terminal may further control the virtual object to perform a corresponding action based on the touch operation.

Specifically, the target button further corresponds to the action control function. The action control function may include action control modes of the plurality of actions. Each action control mode may correspond to one action of the virtual object, or may correspond to one control status of one action of the virtual object. In step 302, when detecting the touch operation on the target button, the terminal may further obtain at least one of a motion status of the current virtual object and an environment for the current virtual object in the virtual scene, and use these as a determining basis. In step 303, 305, and 307, the terminal may determine the action control function as the to-be-triggered target function, and determine a target action control mode in a plurality of action control modes as a target mode corresponding to the action control function according to the at least one of the motion status of the current virtual object and the environment for the current virtual object in the virtual scene. In step 304, 306, and 308, the terminal may further perform any one of the following:

the terminal controls the current virtual object to perform a target action corresponding to the target action control mode, when it is detected that the touch operation is started, based on the target action control mode; and the terminal controls the current virtual object to perform the target action corresponding to the target action control mode, when the terminal detects that the touch operation is started, based on the target action control mode; and the terminal controls an action of the current virtual object to be restored to an action that is before the target action is performed, when the terminal detects that the touch operation is ended.

In this implementation, the action control function may correspond to the action control modes of the plurality of actions, and the terminal may obtain, according to the motion status of the current virtual object, or according to the environment for the current virtual object in the virtual scene, or according to both of the motion status and the environment, a target action that the terminal currently needs to control the virtual object to perform, and an action mode according to which the terminal controls the virtual object to perform the target action, to subsequently control the virtual object to perform a corresponding action. For example, the plurality of actions may include threes actions, namely, the sideways action, the squatting down action, and the getting down action. When the virtual object is around stones in the virtual scene, the terminal may determine that the target action control mode is an action control mode of the sideways action, and control the virtual object to perform the sideways action afterwards. When the virtual object is in a crawling state, the terminal may determine that the target action control mode is an action control mode of the squatting down action, and control the virtual object to perform the squatting down action afterwards.

Two specific examples are merely used for description herein. The plurality of action control modes and a correspondence between the action control mode and either of the motion status of the virtual object and the environment for the virtual object in virtual scene may both be set by a person skilled in the art according to a requirement, or may be set by the user according to a use habit of the user in a customized manner. This is not limited in this embodiment of this application.

Figure 10:
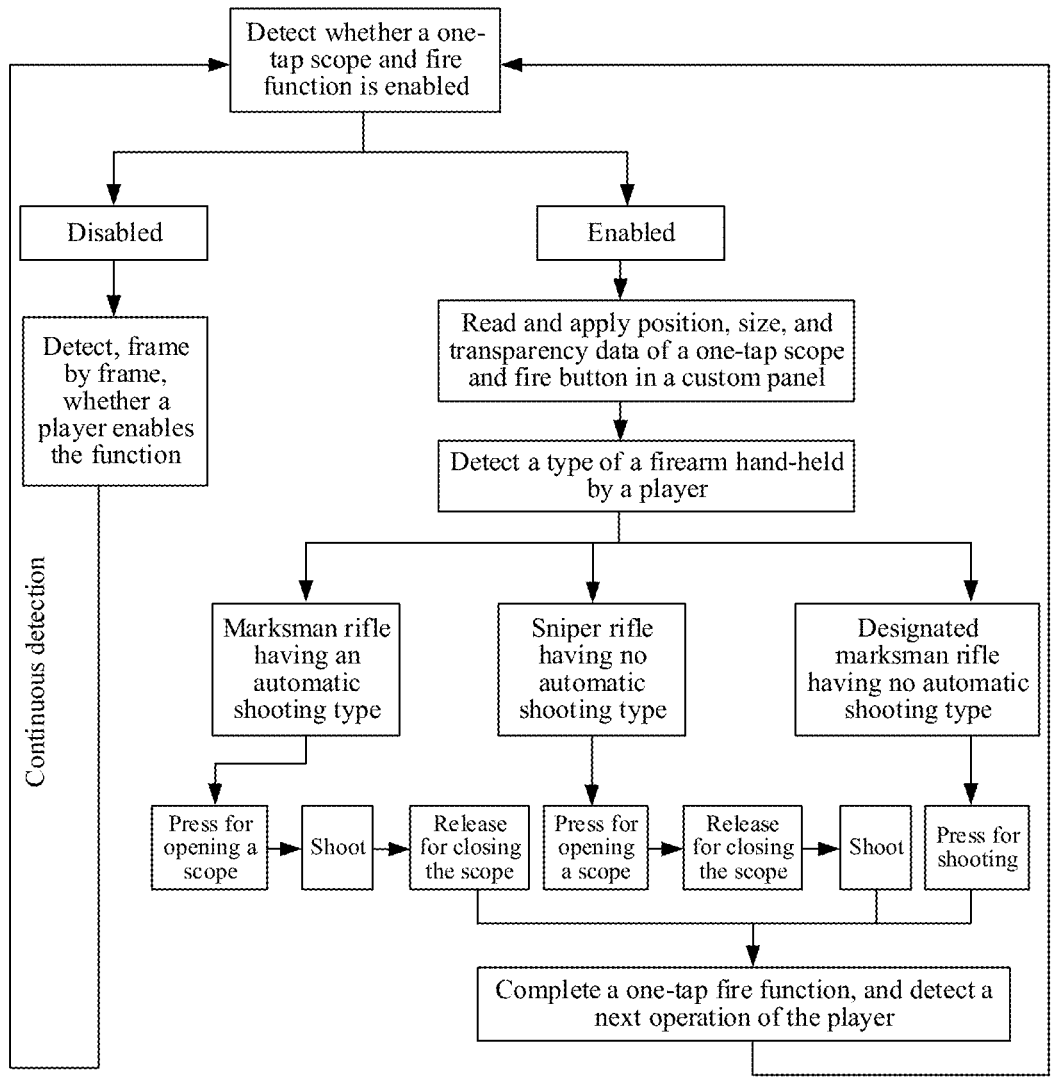
FIG. 10 is a flowchart of an operation control method according to an embodiment of this application.

A manner of a specific example in FIG. 10 is used, to describe a specific procedure of the foregoing operation control method. Referring to FIG. 10, the operation control function is referred to as a "one-tap scope and fire function" herein. A terminal may detect whether the one-tap scope and fire function is enabled, and if the function is on, the terminal may read and apply position, size, and transparency data of a one-tap scope and fire button in a custom panel (a configuration interface). That is, the terminal may determine a status of the operation control function, and if the operation control function is in the enabled state, the terminal may display a target button in a graphics user interface, where the target button has three display parameters, and the three display parameters may be configured in the configuration interface. The terminal may detect a type of a firearm hand-held by a player, that is, the terminal may obtain a type of a virtual item controlled by a current virtual object, and if the type is a first type, for example, the virtual item is a marksman rifle having an automatic shooting type, the terminal may open a scope when a user presses the target button, and close the scope when the user releases the button. If the type is a second type, for example, the virtual item is a sniper rifle that does not have an automatic shooting type, the terminal may open a scope when a user presses the target button, and close the scope and perform shooting when the user releases the button. If the type is a third type, for example, the virtual item is a designated marksman rifle that has no automatic shooting type, the terminal may perform shooting when a user presses the target button. In this way, the terminal completes the one-tap scope and fire function this time, and detects a next operation of the player, and if the one-tap scope and fire function is disabled, the terminal may subsequently detect, frame by frame, whether the player enables the function.

According to this embodiment of this application, a target button corresponding to a display mode switching function and a shooting function is displayed in the graphics user interface, so that when a touch operation on the target button is detected, a to-be-triggered function or to-be-triggered functions of the touch operation may be determined according to the type of the virtual item controlled by the virtual object, and a mode to be followed when a corresponding function is performed this time is determined. Both the display mode switching function and the shooting function correspond to the same button, and one touch operation is performed on one button. In this way, a plurality of operation control functions can be implemented. In addition, one operation may implement different operation control functions according to the type of the virtual item. An operation process is simple and easy to implement, and operation control efficiency is high.

Figure 11:
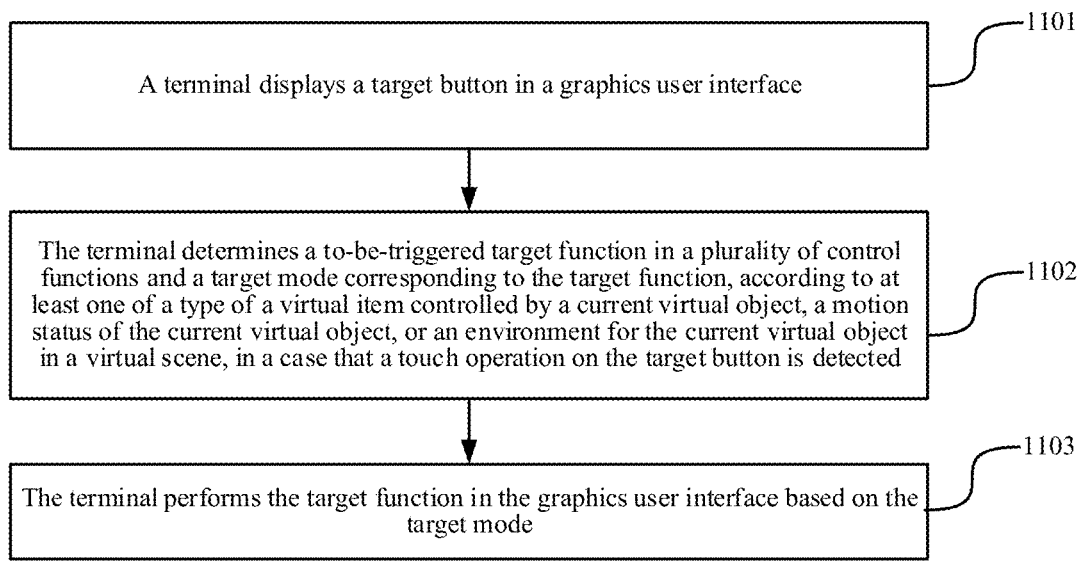
FIG. 11 is a flowchart of an operation control method according to an embodiment of this application.

FIG. 11 is a flowchart of an operation control method according to an embodiment of this application. Referring to FIG. 11, the method may include the following steps:

1101: A terminal displays a target button in a graphics user interface, the target button corresponding to a plurality of control functions, and the plurality of control functions including at least two of a display mode switching function, a shooting function, an action control function, or a viewing angle adjustment function.

Step 1101 is similar to step 301, and a display process of the target button may also include at least one step of step 1 to step 3:

Step 1: The terminal displays the target button at a target position in the graphics user interface.

Step 2: The terminal displays the target button in the graphics user interface according to a target size.

Step 3: The terminal displays the target button in the graphics user interface according to target transparency.

At least one of the target position, the target size, and the target transparency may be set by a person skilled in the art according to a requirement, or may be set by a user according to a habit of the user. Specifically, a setting configured by the user may also include at least one step of step 1 to step 3:

Step 1: The terminal obtains position adjustment information of the target button based on the configuration interface, and obtains the target position of the target button based on the position adjustment information.

Step 2: The terminal obtains size adjustment information of the target button based on the configuration interface, and obtains the target size of the target button based on the size adjustment information.

Step 3: The terminal obtains transparency adjustment information of the target button based on the configuration interface, and obtains the target transparency of the target button based on the transparency adjustment information.

For the foregoing content, refer to step 301. Details are not described herein again in this embodiment of this application.

1102: The terminal determines a to-be-triggered target function in a plurality of control functions and a target mode corresponding to the target function, according to at least one of a type of a virtual item controlled by a current virtual object, a motion status of the current virtual object, or an environment for the current virtual object in a virtual scene, when the touch operation on the target button is detected.

Content shown in step 1102 is similar to content shown in step 302 and step 303, or to content shown in step 302 and step 305, or to content shown in step 302 and step 307. A difference is that the content shown in step 302 and step 303, or the content shown in step 302 and step 305, or the content shown in step 302 and step 307 merely provides an example of determining the to-be-triggered target function in the plurality of control functions corresponding to the target button and the target mode corresponding to the target function according to the type of the virtual item controlled by the current virtual object. The terminal may further determine the target function and the target mode corresponding to the target function based on the motion status of the current virtual object, or according to the environment for the current virtual object in the virtual scene, or according to any combination of the foregoing three influencing factors, for example, a process of determining the target function and the target mode according to the motion status or the environment shown in step 308. Other cases are not provided list by list herein in this embodiment of this application.

One or more influencing factors that are used and that are in the three influencing factors, a correspondence between the influencing factor and the control function and the target mode corresponding to the target function may all be set by a person skilled in the art according to a requirement or may be set by a user according to a use habit of the user in a customized manner. This is not limited in this embodiment of this application.

1103: The terminal performs the target function in the graphics user interface based on the target mode.

Step 1103 is similar to step 304, step 306, and step 308. Details are not described herein in this embodiment of this application. Examples of the three types in the embodiment shown in FIG. 3 and any implementation thereof are all similar to those in this embodiment. Details are not described herein in this embodiment of this application.

According to this embodiment of this application, the target button corresponding to the plurality of control functions is displayed in the graphics user interface, and when the touch operation on the target button is detected, to-be-triggered target functions of the current operation may be determined according to the plurality of influencing factors and a mode to be used for performing these target functions may be determined. The plurality of control functions are all associated with the same button, and one touch operation is performed on one button, so that the plurality of operation control functions can be implemented, and one operation can be performed on the target button according to the influencing factors, to implement different operation control functions. An operation process is simple and easy to implement, and operation control efficiency is high.

All of the above-mentioned technical solutions may be combined in different manners to form other embodiments of this application, and details are not described herein again.

It is to be understood that the steps in the embodiments of this application are not necessarily performed sequentially in a sequence indicated by step numbers. Unless otherwise explicitly specified in this application, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages for the other step.

Figure 12:
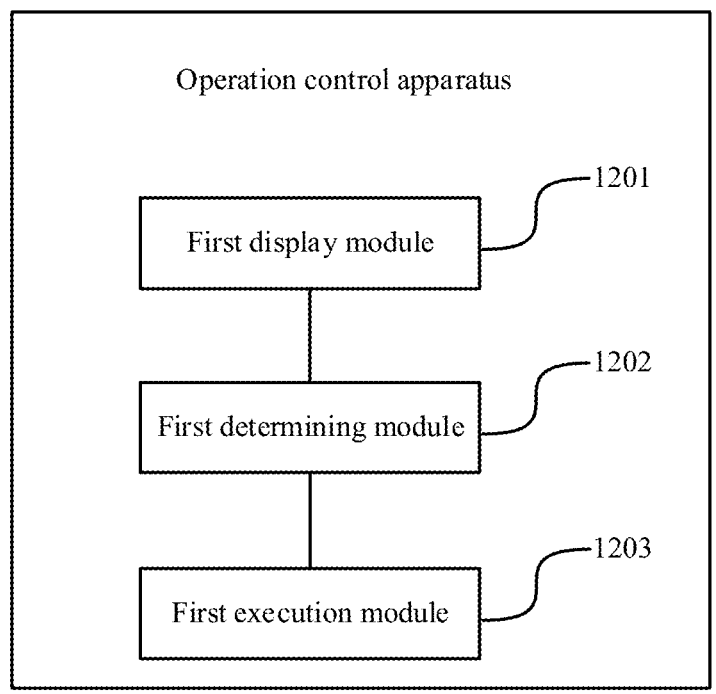
FIG. 12 is a schematic structural diagram of an operation control apparatus according to an embodiment of this application.

FIG. 12 is a schematic structural diagram of an operation control apparatus according to an embodiment of this application. Referring to FIG. 12, the apparatus may include:
  a first display module 1201, configured to display a target button in a graphics user interface, the target button corresponding to a display mode switching function and a shooting function;
  a first determining module 1202, configured to determine a to-be-triggered target function in the display mode switching function and the shooting function and a target mode corresponding to the target function, according to a type of a virtual item controlled by a current virtual object, when a touch operation on the target button is detected; and
  a first execution module 1203, configured to perform the target function in the graphics user interface based on the target mode.

In one implementation, the first determining module 1202 is configured to perform any one of the following:
  determining the display mode switching function and the shooting function as the to-be-triggered target function, determining a target display mode switching mode as a target mode corresponding to the display mode switching function, and determining a first shooting mode as a target mode corresponding to the shooting function, when the type of the virtual item is a first type;
  determining the display mode switching function and the shooting function as the to-be-triggered target function, determining a target display mode switching mode as a target mode corresponding to the display mode switching function, and determining a first shooting mode as a target mode corresponding to the shooting function, when the type of the virtual item is a second type; and
  determining the shooting function as the to-be-triggered target function, and determining a third shooting mode as a target mode corresponding to the shooting function, when the type of the virtual item is a third type.

In one implementation, the first execution module 1203 is configured to perform any one of the following:
  switching a display mode of a virtual scene from a first display mode to a second display mode when it is detected that the touch operation is started, continuously performing the shooting function within duration of the touch operation, and switching the display mode of the virtual scene from the second display mode to the first display mode when it is detected that the touch operation is ended, based on the target display mode switching mode and the first shooting mode when the type of the virtual item is the first type;
  switching the display mode of the virtual scene from the first display mode to the second display mode when it is detected that the touch operation is started, performing the shooting function when it is detected that the touch operation is ended, and switching the display mode of the virtual scene from the second display mode to the first display mode, based on the target display mode switching mode and the second shooting mode when the type of the virtual item is the second type; and
  performing the shooting function when it is detected that the touch operation is started, based on the third shooting mode when the type of the virtual item is the third type.

In one implementation, the first determining module 1202 is configured to:
  obtain a current shooting type of the virtual item when the type of the virtual item is the first type;
  perform a step of determining the display mode switching function and the shooting function as the to-be-triggered target function, determining a target display mode switching mode as a target mode corresponding to the display mode switching function, and determining a first shooting mode as a target mode corresponding to the shooting function, when the shooting type is a first shooting type; and
  determine the display mode switching function and the shooting function as the to-be-triggered target function, determine a target display mode switching mode as a target mode corresponding to the display mode switching function, and determine a second shooting mode as a target mode corresponding to the shooting function, when the shooting type is a second shooting type.

In one implementation, the first display module 1201 is configured to perform at least one of the following:
  displaying the target button at a target position in the graphics user interface;
  displaying the target button in the graphics user interface according to a target size; or
  displaying the target button in the graphics user interface according to target transparency.

In one implementation, the apparatus further includes an obtaining module. The obtaining module is configured to perform at least one of the following:
  obtaining position adjustment information of the target button based on the configuration interface, and obtaining the target position of the target button based on the position adjustment information;

obtaining size adjustment information of the target button based on the configuration interface, and obtaining the target size of the target button based on the size adjustment information; and obtaining transparency adjustment information of the target button based on the configuration interface, and obtaining the target transparency of the target button based on the transparency adjustment information.

In one implementation, the target button further corresponds to the viewing angle adjustment function, and the first determining module 1202 is further configured to determine the viewing angle adjustment function as the to-be-triggered target function, and determine a target viewing angle adjustment mode as a target mode corresponding to the viewing angle adjustment function, when the touch operation on the target button is detected; and the first execution module 1203 is further configured to adjust the viewing angle of the virtual scene based on an operation direction and an operation speed of the touch operation within duration of the touch operation and based on the target viewing angle adjustment mode.

In one implementation, the target button further corresponds to an action control function, and the first determining module 1202 is further configured to determine the action control adjustment function as the to-be-triggered target function, and determine a target action control adjustment mode as a target mode corresponding to the action control adjustment function, when the touch operation on the target button is detected; and the first execution module 1203 is further configured to perform any one of the following:

controlling the current virtual object to perform a target action, when it is detected that the touch operation is started, based on the target action control mode; and controlling the current virtual object to perform the target action, when it is detected that the touch operation is started, based on the target action control mode; and controlling an action of the current virtual object to be restored to an action that is before the target action is performed, when it is detected that the touch operation is ended.

In one implementation, the target button further corresponds to an action control function, and the first determining module 1202 is further configured to determine the action control adjustment function as the to-be-triggered target function when the touch operation on the target button is detected, and determine a target action control adjustment mode in a plurality of action control modes as a target mode corresponding to the action control adjustment function according to at least one of a motion status of the current virtual object and an environment for the current virtual object in the virtual scene; and the first execution module 1203 is further configured to perform any one of the following:

controlling the current virtual object to perform a target action corresponding to the target action control mode, when it is detected that the touch operation is started, based on the target action control mode; and controlling the current virtual object to perform the target action corresponding to the target action control mode, when it is detected that the touch operation is started, based on the target action control mode; and controlling an action of the current virtual object to be restored to an action that is before the target action is performed, when it detected the touch operation is ended.

In one implementation, the first display module 1201 is configured to perform the step of displaying the target button in the graphics user interface in case that the operation control function is determined to be in an enabled state according to configuration information.

According to the apparatus in this embodiment of this application, a target button corresponding to a display mode switching function and a shooting function is displayed in the graphics user interface, so that when a touch operation on the target button is detected, a to-be-triggered function or to-be-triggered functions of the touch operation may be determined according to the type of the virtual item controlled by the virtual object, and a mode to be followed when a corresponding function is performed this time is determined. Both the display mode switching function and the shooting function correspond to the same button, and one touch operation is performed on one button. In this way, a plurality of operation control functions can be implemented. In addition, one operation may implement different operation control functions according to the type of the virtual item. An operation process is simple and easy to implement, and operation control efficiency is high.

When the apparatus provided in the foregoing embodiments implements functions of the apparatus, it is illustrated with an example of division of each functional module. In the practical application, the function distribution may be finished by different functional module s according to the requirements, that is, the internal structure of the electronic device is divided into different functional modules, to implement all or some of the functions described above. In addition, the apparatus and method embodiments provided in the foregoing embodiments belong to one conception. For the specific implementation process, reference may be made to the method embodiments, and details are not described herein again.

Figure 13:
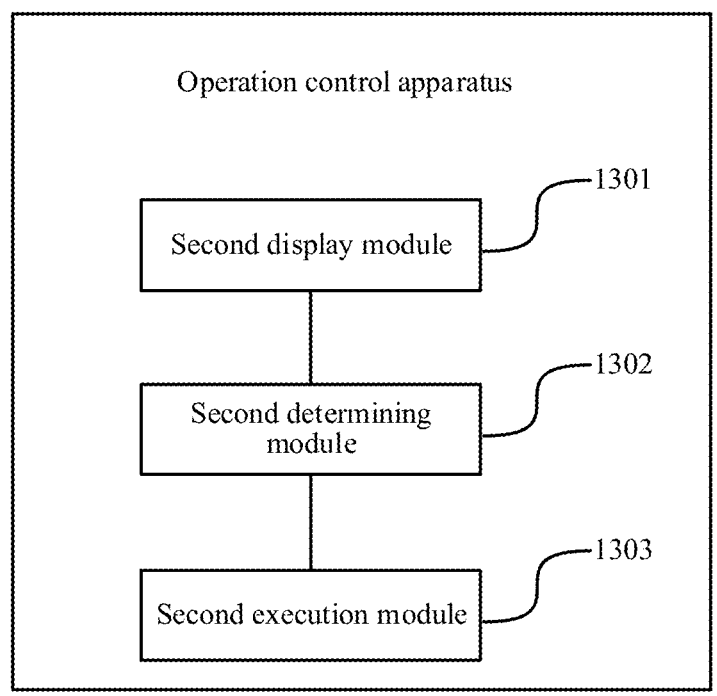
FIG. 13 is a schematic structural diagram of an operation control apparatus according to an embodiment of this application.

FIG. 13 is a schematic structural diagram of an operation control apparatus according to an embodiment of this application. Referring to FIG. 13, the apparatus may include:

a second display module 1301, configured to display a target button in a graphics user interface, the target button corresponding to a plurality of control functions, and the plurality of control functions including at least two of a display mode switching function, a shooting function, an action control function, or a viewing angle adjustment function;

a second determining module 1302, configured to determine a to-be-triggered target function in the plurality of control functions and a target mode corresponding to the target function, according to at least one of a type of a virtual item controlled by a current virtual object, a motion status of the current virtual object, or an environment for the current virtual object in a virtual scene, when a touch operation on the target button is detected; and a second execution module 1303, configured to perform the target function in the graphics user interface based on the target mode.

In one implementation, when the target button corresponds to the display mode switching function and the shooting function, the second determining module 1302 is configured to perform any one of the following:

determining the display mode switching function and the shooting function as the to-be-triggered target function, determining a target display mode switching mode as a target mode corresponding to the display mode switching function, and determining a first shooting mode as a target mode corresponding to the shooting function, when the type of the virtual item is a first type;

determining the display mode switching function and the shooting function as the to-be-triggered target function, determining a target display mode switching mode as a target mode corresponding to the display mode switching function, and determining a first shooting mode as a target mode corresponding to the shooting function, when the type of the virtual item is a second type; and determining the shooting function as the to-be-triggered target function, and determining a third shooting mode as a target mode corresponding to the shooting function, when the type of the virtual item is a third type.

In one implementation, the second execution module 1303 is configured to perform any one of the following:

switching a display mode of a virtual scene from a first display mode to a second display mode when it is detected that the touch operation is started, continuously performing the shooting function within duration of the touch operation, and switching the display mode of the virtual scene from the second display mode to the first display mode when it is detected that the touch operation is ended, based on the target display mode switching mode and the first shooting mode when the type of the virtual item is the first type;

switching the display mode of the virtual scene from the first display mode to the second display mode when it is detected that the touch operation is started, performing the shooting function when it is detected that the touch operation is ended, and switching the display mode of the virtual scene from the second display mode to the first display mode, based on the target display mode switching mode and the second shooting mode when the type of the virtual item is the second type; and performing the shooting function when it is detected that the touch operation is started, based on the third shooting mode when the type of the virtual item is the third type.

In one implementation, the second determining module 1302 is configured to:

obtain a current shooting type of the virtual item when the type of the virtual item is the first type;

perform a step of determining the display mode switching function and the shooting function as the to-be-triggered target function, determining a target display mode switching mode as a target mode corresponding to the display mode switching function, and determining a first shooting mode as a target mode corresponding to the shooting function, when the shooting type is a first shooting type; and determine the display mode switching function and the shooting function as the to-be-triggered target function, determine a target display mode switching mode as a target mode corresponding to the display mode switching function, and determine a second shooting mode as a target mode corresponding to the shooting function, when the shooting type is a second shooting type.

In one implementation, the second display module 1301 is configured to perform at least one of the following:

displaying the target button at a target position in the graphics user interface;

displaying the target button in the graphics user interface according to a target size; or displaying the target button in the graphics user interface according to target transparency.

In one implementation, the apparatus further includes an obtaining module. The obtaining module is configured to perform at least one of the following:

obtaining position adjustment information of the target button based on the configuration interface, and obtaining the target position of the target button based on the position adjustment information;

obtaining size adjustment information of the target button based on the configuration interface, and obtaining the target size of the target button based on the size adjustment information; and obtaining transparency adjustment information of the target button based on the configuration interface, and obtaining the target transparency of the target button based on the transparency adjustment information.

In one implementation, the second determining module 1302 is further configured to determine the viewing angle adjustment function as the to-be-triggered target function, and determine a target viewing angle adjustment mode as a target mode corresponding to the viewing angle adjustment function, when the touch operation on the target button is detected and the target button corresponds to the viewing angle adjustment function; and the second execution module 1303 is configured to adjust the viewing angle of the virtual scene based on an operation direction and an operation speed of the touch operation within duration of the touch operation and based on the target viewing angle adjustment mode.

In one implementation, the first determining module 1302 is configured to determine the action control adjustment function as the to-be-triggered target function, and determine a target action control adjustment mode as a target mode corresponding to the action control adjustment function, when the touch operation on the target button is detected and the target button corresponds to the action control function; and the second execution module 1303 is configured to perform at least one of the following:

controlling the current virtual object to perform a target action, when it is detected that the touch operation is started, based on the target action control mode; and controlling an action of the current virtual object to be restored to an action that is before the target action is performed, when it is detected that the touch operation is ended.

In one implementation the first determining module 1302 is configured to determine the action control adjustment function as the to-be-triggered target function when the touch operation on the target button is detected and the target button further corresponds to an action control function, and determine a target action control adjustment mode in a plurality of action control modes as a target mode corresponding to the action control adjustment function according to at least one of a motion status of the current virtual object and an environment for the current virtual object in the virtual scene; and the second execution module 1303 is configured to perform at least one of the following:

controlling the current virtual object to perform a target action corresponding to the target action control mode, when it is detected that the touch operation is started, based on the target action control mode; and controlling an action of the current virtual object to be restored to an action that is before the target action is performed, when it is detected that the touch operation is ended.

In one implementation, the second display module 1301 is configured to perform the step of displaying the target button in the graphics user interface in case that the operation control function is determined to be in an enabled state according to configuration information.

According to the apparatus in this embodiment of this application, the target button corresponding to the plurality of control functions is displayed in the graphics user interface, and when the touch operation on the target button is detected, to-be-triggered target functions of the current operation may be determined according to the plurality of influencing factors and a mode to be used for performing these target functions may be determined. The plurality of control functions are all associated with the same button, and one touch operation is performed on one button, so that the plurality of operation control functions can be implemented, and one operation can be performed on the target button according to the influencing factors, to implement different operation control functions. An operation process is simple and easy to implement, and operation control efficiency is high.

When the apparatus provided in the foregoing embodiments implements functions of the apparatus, it is illustrated with an example of division of each functional module. In the practical application, the function distribution may be finished by different functional module s according to the requirements, that is, the internal structure of the electronic device is divided into different functional modules, to implement all or some of the functions described above. In addition, the apparatus and method embodiments provided in the foregoing embodiments belong to one conception. For the specific implementation process, reference may be made to the method embodiments, and details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The foregoing electronic device may be provided as a terminal shown in FIG. 14 below; or may be provided as a server shown in FIG. 15 below. This is not limited in the embodiments of this application.

Figure 14:
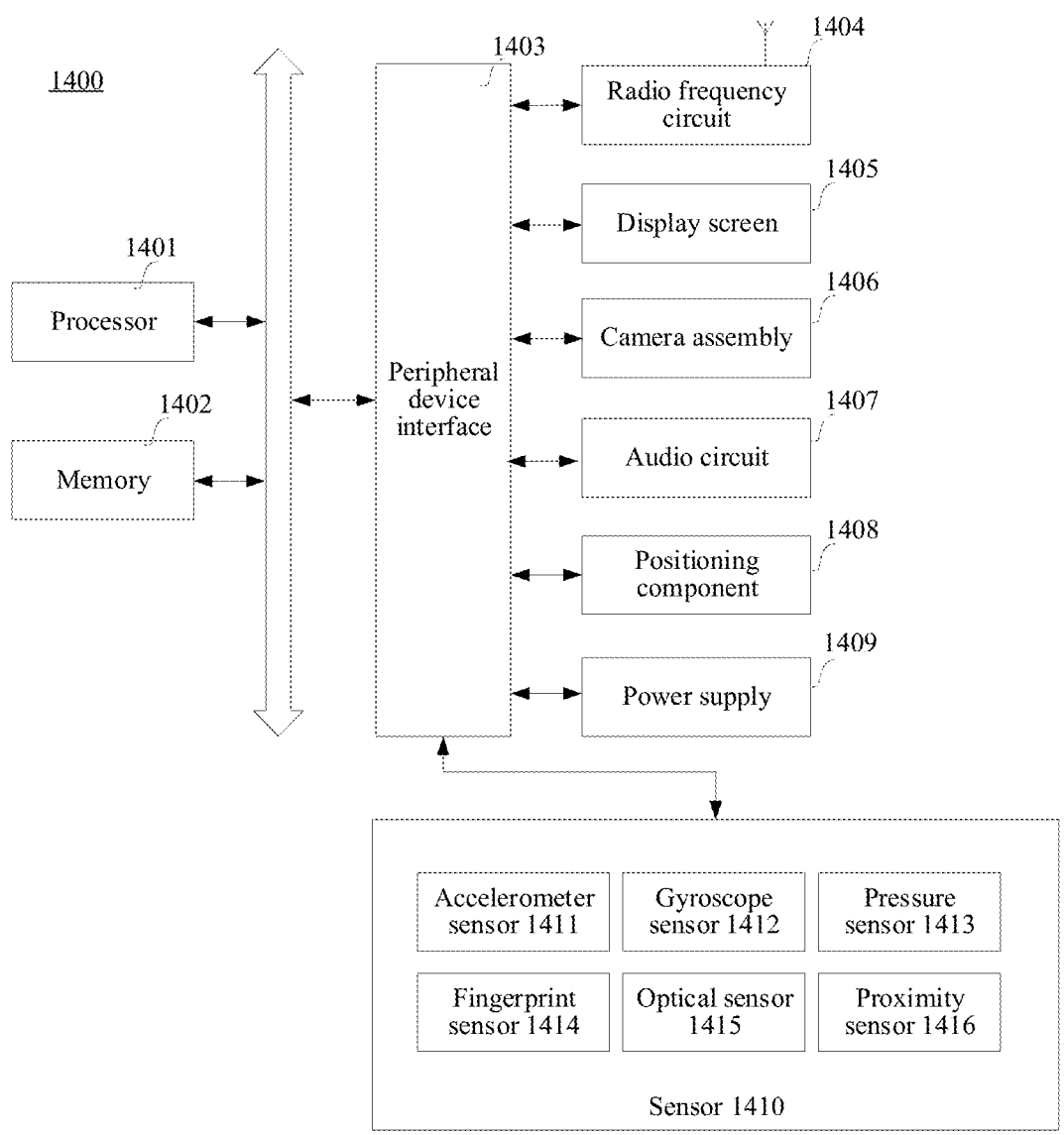
FIG. 14 is a schematic structural diagram of a terminal according to an embodiment of this application.

FIG. 14 is a schematic structural diagram of a terminal according to an embodiment of this application. The terminal 1400 may be a smartphone, a tablet computer, a moving picture experts group audio layer III (MP3) player, a moving picture experts group audio layer IV (MP4) player, a notebook computer, or a desktop computer. The terminal 1400 may also be referred to as another name such as user equipment, a portable terminal, a laptop terminal, or a desktop terminal.

Generally, the terminal 1400 includes one or more processors 1401 and one or more memories 1402.

The processor 1401 may include one or more processing cores, for example, a 4-core processor or an 8-core processor. The processor 1401 may be implemented in at least one hardware form of a digital signal processor (DSP), a field-programmable gate array (FPGA), and a programmable logic array (PLA). The processor 1401 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1401 may be integrated with a graphics processing unit (GPU). The GPU is configured to render and draw content that needs to be displayed on a display screen. In some embodiments, the processor 1401 may further include an artificial intelligence (AI) processor. The AI processor is configured to process computing operations related to machine learning.

The memory 1402 may include one or more computer-readable storage media. The computer-readable storage medium may be non-transient. The memory 1402 may further include a high-speed random access memory (RAM) and a non-volatile memory, for example, one or more disk storage devices or flash storage devices. In some embodiments, the non-transitory computer-readable storage medium in the memory 1402 is configured to store at least one instruction. The at least one instruction is used to be executed by the processor 1401 to implement the operation control method provided by the method embodiments of this application.

In some embodiments, the terminal 1400 may optionally further include: a peripheral device interface 1403 and at least one peripheral device. The processor 1401, the memory 1402, and the peripheral device interface 1403 may be connected through a bus or a signal cable. Each peripheral device may be connected to the peripheral device interface 1403 through a bus, a signal cable, or a circuit board. Specifically, the peripheral device includes: at least one of a radio frequency (RF) circuit 1404, a display screen 1405, a camera component 1406, an audio frequency circuit 1407, a positioning component 1408, and a power source 1409.

The peripheral device interface 1403 may be configured to connect at least one peripheral device related to input/output (I/O) to the processor 1401 and the memory 1402. In some embodiments, the processor 1401, the memory 1402 and the peripheral device interface 1403 are integrated on a same chip or circuit board. In some other embodiments, any one or two of the processor 1401, the memory 1402, and the peripheral device interface 1403 may be implemented on a single chip or circuit board. This is not limited in this embodiment.

The RF circuit 1404 is configured to receive and transmit an RF signal, also referred to as an electromagnetic signal. The RF circuit 1404 communicates with a communications network and other communications devices by using the electromagnetic signal. The RF circuit 1404 converts an electrical signal into an electromagnetic signal for transmission, or converts a received electromagnetic signal into an electrical signal. Optionally, the RF circuit 1404 includes: an antenna system, an RF transceiver, one or more amplifiers, a tuner, an oscillator, a digital signal processor, a codec chip set, a subscriber identity module card, and the like. The RF circuit 1404 may communicate with another terminal by using at least one wireless communications protocol. The wireless communications protocol includes, but is not limited to: a metropolitan area network, generations of mobile communications networks (2G, 3G, 4G, and 5G), a wireless local area network and/or a wireless fidelity (Wi-Fi) network. In some embodiments, the RF 1404 may further include a circuit related to near field communication (NFC), which is not limited in this application.

The display screen 1405 is configured to display a user interface (UI). The UI may include a graph, text, an icon, a video, and any combination thereof. When the display screen 1405 is a touch display screen, the display screen 1405 further has a capability of collecting a touch signal on or above the surface of the display screen 1405. The touch signal may be inputted to the processor 1401 as a control signal for processing. In this case, the display screen 1405 may be further configured to provide a virtual button and/or a virtual keyboard that are/is also referred to as a soft button and/or a soft key board. In some embodiments, there may be one display screen 1405, disposed on a front panel of the terminal 1400. In some other embodiments, there may be at least two display screens 1405, respectively disposed on different surfaces of the terminal 1400 or designed in a folded shape. In still some other embodiments, the display screen 1405 may be a flexible display screen, disposed on a curved surface or a folded surface of the terminal 1400. Even, the display screen 1405 may be further set in a non-rectangular irregular pattern, namely, a special-shaped screen. The display screen 1405 may be prepared by using materials such as a liquid crystal display (LCD), an organic light-emitting diode (OLED), or the like.

The camera component 1406 is configured to collect images or videos. Optionally, the camera component 1406 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any of a main camera, a depth-of-field camera, a wide-angle camera, and a telephoto camera, to achieve a background blur function through fusion of the main camera and the depth-of-field camera, panoramic photographing and virtual reality (VR) photographing functions through fusion of the main camera and the wide-angle camera, or other fusion photographing functions. In some embodiments, the camera component 1406 may also include a flash. The flash may be a monochrome temperature flash, or may be a double color temperature flash. The double color temperature flash refers to a combination of a warm light flash and a cold light flash, and may be used for light compensation under different color temperatures.

The audio circuit 1407 may include a microphone and a speaker. The microphone is configured to collect sound waves of a user and an environment, and convert the sound waves into an electrical signal to input to the processor 1401 for processing, or input to the radio frequency circuit 1404 for implementing voice communication. For the purpose of stereo collection or noise reduction, there may be a plurality of microphones, respectively disposed at different portions of the terminal 1400. The microphone may further be an array microphone or an omni-directional collection type microphone. The speaker is configured to convert the electrical signal from the processor 1401 or the radio frequency circuit 1404 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1407 may also include a headphone jack.

The positioning component 1408 is configured to position a current geographic location of the terminal 1400, to implement navigation or a location based service (LBS). The positioning component 1408 may be a positioning component based on the Global Positioning System (GPS) of the United States, the BeiDou System of China, the GLONASS System of Russia, or the GALILEO System of the European Union.

The power supply 1409 is configured to supply power to components in the terminal 1400. The power supply 1409 may be an alternating current, a direct current, a primary battery, or a rechargeable battery. In a case that the power supply 1409 includes the rechargeable battery, the rechargeable battery may support wired charging or wireless charging. The rechargeable battery may be further configured to support a fast charging technology.

In some embodiments, the terminal 1400 further includes one or more sensors 1410. The one or more sensors 1410 include, but are not limited to: an acceleration sensor 1411, a gyroscope sensor 1412, a pressure sensor 1413, a fingerprint sensor 1414, an optical sensor 1415, and a proximity sensor 1416.

The acceleration sensor 1411 may detect a magnitude of acceleration on three coordinate axes of a coordinate system established with the terminal 1400. For example, the acceleration sensor 1411 may be configured to detect components of gravity acceleration on the three coordinate axes. The processor 1401 may control, according to a gravity acceleration signal collected by the acceleration sensor 1411, the display screen 1405 to display the user interface in a frame view or a portrait view. The acceleration sensor 1411 may be further configured to collect data of a game or a user movement.

The gyroscope sensor 1412 may detect a body direction and a rotation angle of the terminal 1400. The gyroscope sensor 1412 may cooperate with the acceleration sensor 1411 to collect a 3D action by the user on the terminal 1400. The processor 1401 may implement the following functions according to the data collected by the gyroscope sensor 1412: motion sensing (such as changing the UI according to a tilt operation of the user), image stabilization at shooting, game control, and inertial navigation.

The pressure sensor 1413 may be disposed on a side frame of the terminal 1400 and/or a lower layer of the display screen 1405. When the pressure sensor 1413 is disposed on the side frame of the terminal 1400, a holding signal of the user on the terminal 1400 may be detected. The processor 1401 performs left and right hand recognition or a quick operation according to the holding signal collected by the pressure sensor 1413. When the pressure sensor 1413 is disposed on the low layer of the display screen 1405, the processor 1401 controls, according to a pressure operation of the user on the display screen 1405, an operable control on the UI. The operable control includes at least one of a button control, a scroll-bar control, an icon control, and a menu control.

The fingerprint sensor 1414 is configured to collect a user's fingerprint, and the processor 1401 identifies a user's identity according to the fingerprint collected by the fingerprint sensor 1414, or the fingerprint sensor 1414 identifies a user's identity according to the collected fingerprint. When identifying that the user's identity is a trusted identity, the processor 1401 authorizes the user to perform related sensitive operations. The sensitive operations include: unlocking a screen, viewing encrypted information, downloading software, paying, changing a setting, and the like. The fingerprint sensor 1414 may be disposed on a front surface, a back surface, or a side surface of the terminal 1400. When a physical button or a vendor logo is disposed on the terminal 1400, the fingerprint 1414 may be integrated with the physical button or the vendor logo.

The optical sensor 1415 is configured to collect ambient light intensity. In an embodiment, the processor 1401 may control display luminance of the display screen 1405 according to the ambient light intensity collected by the optical sensor 1415. Specifically, when the ambient light intensity is relatively high, the display luminance of the display screen 1405 is increased. When the ambient light intensity is relatively low, the display luminance of the display screen 1405 is reduced. In another embodiment, the processor 1401 may further dynamically adjust a camera parameter of the camera component 1406 according to the ambient light intensity collected by the optical sensor 1415.

The proximity sensor 1416, also referred to as a distance sensor, is generally disposed on the front panel of the terminal 1400. The proximity sensor 1416 is configured to collect a distance between the user and the front surface of the terminal 1400. In an embodiment, when the proximity sensor 1416 detects that the distance between the user and the front surface of the terminal 1400 gradually becomes smaller, the display screen 1405 is controlled by the processor 1401 to switch from a screen-on state to a screen-off state. In a case that the proximity sensor 1416 detects that the distance between the user and the front surface of the terminal 1400 gradually becomes larger, the display screen 1405 is controlled by the processor 1401 to switch from the screen-off state to the screen-on state.

A person skilled in the art may understand that the structure shown in FIG. 14 constitutes no limitation on the terminal 1400, and the terminal may include more or fewer components than those shown in the figure, or some components may be combined, or a different component deployment may be used.

Figure 15:
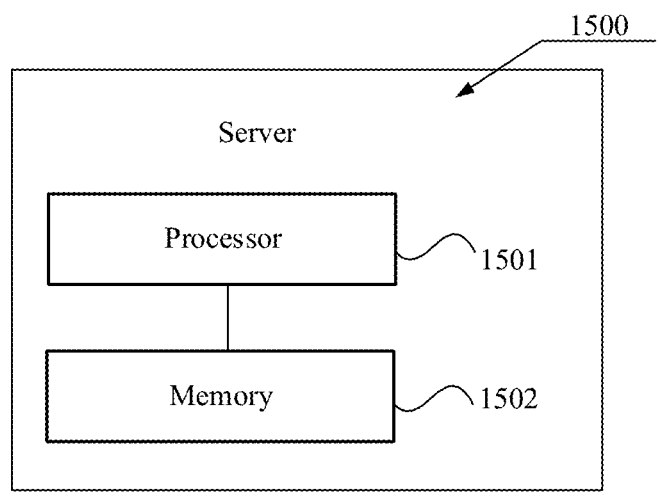
FIG. 15 is a schematic structural diagram of a server according to an embodiment of this application.

FIG. 15 is a schematic structural diagram of a server according to an embodiment of this application. The server 1500 may vary greatly because a configuration or performance varies, and may include one or more CPUs 1501 and one or more memories 1502. The one or more memories 1502 store at least one instruction, and the at least one instruction is loaded and executed by the one or more processors 1501 to implement the operation control methods provided in the foregoing various method embodiments. Certainly, the server 1500 may also have a wired or wireless network interface, a keyboard, an input/output interface and other components to facilitate input/output. The server 1500 may also include other components for implementing device functions. Details are not described herein again.

In an exemplary embodiment, a computer-readable storage medium is further provided, for example, a memory including instructions. The instructions may be executed by a processor to complete the operation control methods in the foregoing embodiments. For example, the computer-readable storage medium may be a read-only memory (ROM), a RAM, a compact disc read-only memory (CD-ROM), a magnetic tape, a floppy disk, an optical data storage device, or the like.

A person of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a ROM, a magnetic disk, an optical disc, or the like. The foregoing descriptions are merely exemplary embodiments of this application, but are not intended to limit this application. Any modification, equivalent replacement, or improvement made within the spirit and principle of this application shall fall within the protection scope of this application.

What is claimed is:

1. An operation control method, performed by an electronic device, the method comprising:
displaying a target button in a graphics user interface of a game application, the target button corresponding to a display mode switching function and a shooting function;
determining a type of a virtual item controlled by a current virtual object in the game application;
detecting a touch operation on the target button;
in response to the detecting, determining a to-be-triggered target function in the display mode switching function and the shooting function and a target mode corresponding to the target function according to the type of the virtual item; and
performing the target function in the graphics user interface based on the target mode.

2. The method according to claim 1, wherein the determining a to-be-triggered target function in the display mode switching function and the shooting function and a target mode corresponding to the target function according to the type of the virtual item comprises:
determining the display mode switching function and the shooting function as the to-be-triggered target function, determining a target display mode switching mode as a target mode corresponding to the display mode switching function, and determining a first shooting mode as a target mode corresponding to the shooting function, when the type of the virtual item is a first type.

3. The method according to claim 2, wherein the performing the target function in the graphics user interface based on the target mode comprises:
switching a display mode of a virtual scene from a first display mode to a second display mode when it is detected that the touch operation is started, continuously performing the shooting function within duration of the touch operation, and switching the display mode of the virtual scene from the second display mode to the first display mode when it is detected that the touch operation is ended, based on the target display mode switching mode and the first shooting mode when the type of the virtual item is the first type.

4. The method according to claim 2, wherein the determining a to-be-triggered target function in the display mode switching function and the shooting function and a target mode corresponding to the target function according to the type of the virtual item comprises:
obtaining a current shooting type of the virtual item when the type of the virtual item is the first type; and
performing the operation of determining the display mode switching function and the shooting function as the to-be-triggered target function, determining a target display mode switching mode as a target mode corresponding to the display mode switching function, and determining a first shooting mode as a target mode corresponding to the shooting function, when the shooting type is a first shooting type; or
determining the display mode switching function and the shooting function as the to-be-triggered target function, determining the target display mode switching mode as the target mode corresponding to the display mode switching function, and determining a second shooting mode as the target mode corresponding to the shooting function, when the shooting type is a second shooting type.

5. The method according to claim 1, wherein the determining a to-be-triggered target function in the display mode switching function and the shooting function and a target mode corresponding to the target function according to the type of the virtual item comprises:
　　determining the display mode switching function and the shooting function as the to-be-triggered target function, determining a target display mode switching mode as a target mode corresponding to the display mode switching function, and determining a second shooting mode as a target mode corresponding to the shooting function, when the type of the virtual item is a second type.

6. The method according to claim 5, wherein the performing the target function in the graphics user interface based on the target mode comprises:
　　switching a display mode of a virtual scene from a first display mode to a second display mode when it is detected that the touch operation is started, performing the shooting function when it is detected that the touch operation is ended, and switching the display mode of the virtual scene from the second display mode to the first display mode, based on the target display mode switching mode and the second shooting mode when the type of the virtual item is the second type.

7. The method according to claim 1, wherein the determining a to-be-triggered target function in the display mode switching function and the shooting function and a target mode corresponding to the target function according to the type of the virtual item comprises:
　　determining the shooting function as the to-be-triggered target function; and
　　determining a third shooting mode as a target mode corresponding to the shooting function, when the type of the virtual item is a third type.

8. The method according to claim 7, wherein the performing the target function in the graphics user interface based on the target mode comprises:
　　performing the shooting function when it is detected that the touch operation is started, based on the third shooting mode when the type of the virtual item is the third type.

9. The method according to claim 1, wherein the displaying a target button in a graphics user interface comprises at least one of the following:
　　displaying the target button at a target position in the graphics user interface;
　　displaying the target button in the graphics user interface according to a target size; or
　　displaying the target button in the graphics user interface according to target transparency.

10. The method according to claim 9, wherein the method further comprises at least one of the following:
　　obtaining position adjustment information of the target button based on a configuration interface, and obtaining the target position of the target button based on the position adjustment information;
　　obtaining size adjustment information of the target button based on a configuration interface, and obtaining the target size of the target button based on the size adjustment information; or
　　obtaining transparency adjustment information of the target button based on a configuration interface, and obtaining the target transparency of the target button based on the transparency adjustment information.

11. The method according to claim 1, wherein the target button further corresponds to a viewing angle adjustment function; and the method further comprises:
　　determining the viewing angle adjustment function as the to-be-triggered target function, and determining a target viewing angle adjustment mode as a target mode corresponding to the viewing angle adjustment function, when the touch operation on the target button is detected; and
　　the performing the target function in the graphics user interface based on the target mode further comprises:
　　adjusting a viewing angle of a virtual scene based on an operation direction and an operation speed of the touch operation within duration of the touch operation and based on the target viewing angle adjustment mode.

12. The method according to claim 1, wherein the target button further corresponds to an action control function; and the method further comprises:
　　determining the action control function as the to-be-triggered target function, and determining a target action control mode as a target mode corresponding to the action control function, when the touch operation on the target button is detected; and
　　the performing the target function in the graphics user interface based on the target mode further comprises at least one of the following:
　　controlling the current virtual object to perform a target action, when it is detected that the touch operation is started, based on the target action control mode; and
　　controlling an action of the current virtual object to be restored to an action that is before the target action is performed, when it is detected that the touch operation is ended.

13. The method according to claim 1, wherein the target button further corresponds to an action control function; and the method further comprises:
　　determining the action control function as the to-be-triggered target function when the touch operation on the target button is detected, and determining, according to at least one of a motion status of the current virtual object or an environment for the current virtual object in a virtual scene, a target action control mode in a plurality of action control modes as a target mode corresponding to the action control function; and
　　the performing the target function in the graphics user interface based on the target mode further comprises at least one of the following:
　　controlling the current virtual object to perform a target action corresponding to the target action control mode, when it is detected that the touch operation is started, based on the target action control mode; and
　　controlling an action of the current virtual object to be restored to an action that is before the target action is performed, when it is detected that the touch operation is ended.

14. The method according to claim 1, wherein the displaying a target button in a graphics user interface comprises:
　　performing the operation of displaying a target button in a graphics user interface, when an operation control function is determined to be in an enabled state according to configuration information.

15. An electronic device, comprising a memory and a processor, the memory storing computer-readable instructions, and the computer-readable instructions, when executed by the processor, causing the electronic device to perform a plurality of operations comprising:
　　displaying a target button in a graphics user interface of a game application, the target button corresponding to a display mode switching function and a shooting function;

determining a type of a virtual item controlled by a current virtual object in the game application;

detecting a touch operation on the target button;

in response to the detecting, determining a to-be-triggered target function in the display mode switching function and the shooting function and a target mode corresponding to the target function according to the type of the virtual item; and performing the target function in the graphics user interface based on the target mode.

16. The electronic device according to claim 15, wherein the determining a to-be-triggered target function in the display mode switching function and the shooting function and a target mode corresponding to the target function according to the type of the virtual item comprises:

determining the display mode switching function and the shooting function as the to-be-triggered target function, determining a target display mode switching mode as a target mode corresponding to the display mode switching function, and determining a first shooting mode as a target mode corresponding to the shooting function, when the type of the virtual item is a first type;

determining the display mode switching function and the shooting function as the to-be-triggered target function, determining a target display mode switching mode as a target mode corresponding to the display mode switching function, and determining a second shooting mode as a target mode corresponding to the shooting function, when the type of the virtual item is a second type; and determining the shooting function as the to-be-triggered target function, and determining a third shooting mode as a target mode corresponding to the shooting function, when the type of the virtual item is a third type.

17. The electronic device according to claim 15, wherein the target button further corresponds to a viewing angle adjustment function; and the plurality of operations further comprise:

determining the viewing angle adjustment function as the to-be-triggered target function, and determining a target viewing angle adjustment mode as a target mode corresponding to the viewing angle adjustment function, when the touch operation on the target button is detected; and the performing the target function in the graphics user interface based on the target mode further comprises:

adjusting a viewing angle of a virtual scene based on an operation direction and an operation speed of the touch operation within duration of the touch operation and based on the target viewing angle adjustment mode.

18. The electronic device according to claim 15, wherein the target button further corresponds to a viewing angle adjustment function; and the plurality of operations further comprise:

determining the action control function as the to-be-triggered target function, and determining a target action control mode as a target mode corresponding to the action control function, when the touch operation on the target button is detected; and the performing the target function in the graphics user interface based on the target mode further comprises at least one of the following:

controlling the current virtual object to perform a target action, when it is detected that the touch operation is started, based on the target action control mode; and controlling an action of the current virtual object to be restored to an action that is before the target action is performed, when it is detected that the touch operation is ended.

19. The electronic device according to claim 15, wherein the target button further corresponds to a viewing angle adjustment function; and the plurality of operations further comprise:

determining the action control function as the to-be-triggered target function when the touch operation on the target button is detected, and determining, according to at least one of a motion status of the current virtual object or an environment for the current virtual object in a virtual scene, a target action control mode in a plurality of action control modes as a target mode corresponding to the action control function; and the performing the target function in the graphics user interface based on the target mode further comprises at least one of the following:

controlling the current virtual object to perform a target action corresponding to the target action control mode, when it is detected that the touch operation is started, based on the target action control mode; and controlling an action of the current virtual object to be restored to an action that is before the target action is performed, when it is detected that the touch operation is ended.

20. One or more non-transitory storage media comprising computer-readable instructions, the computer-readable instructions, when executed by one or more processors of an electronic device, causing the electronic device to perform a plurality of operations comprising:

displaying a target button in a graphics user interface of a game application, the target button corresponding to a display mode switching function and a shooting function;

determining a type of a virtual item controlled by a current virtual object in the game application;

detecting a touch operation on the target button;

in response to the detecting, determining a to-be-triggered target function in the display mode switching function and the shooting function and a target mode corresponding to the target function according to the type of the virtual item; and performing the target function in the graphics user interface based on the target mode.

* * * * *